US009556311B2

(12) United States Patent
Sohn et al.

(10) Patent No.: US 9,556,311 B2
(45) Date of Patent: Jan. 31, 2017

(54) POLYIMIDE PRECURSOR COMPOSITION, ARTICLE PREPARED BY USING SAME, AND DISPLAY DEVICE INCLUDING THE ARTICLE

(71) Applicant: SAMSUNG ELECTRONICS CO., LTD., Suwon-si, Gyeonggi-do (KR)

(72) Inventors: Byung Hee Sohn, Yongin-si (KR); Sang Soo Lee, Seongnam-si (KR); Jae Jun Lee, Suwon-si (KR); Hyun Jeong Jeon, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 13/944,283

(22) Filed: Jul. 17, 2013

(65) Prior Publication Data

US 2014/0024786 A1 Jan. 23, 2014

(30) Foreign Application Priority Data

Jul. 19, 2012 (KR) ........................ 10-2012-0078652

(51) Int. Cl.
*C08L 79/08* (2006.01)
*C08G 73/10* (2006.01)

(52) U.S. Cl.
CPC ....... *C08G 73/1067* (2013.01); *C08G 73/1039* (2013.01)

(58) Field of Classification Search
None
See application file for complete search history.

(56) References Cited

U.S. PATENT DOCUMENTS

| | | | | |
|---|---|---|---|---|
| 4,187,364 | A | 2/1980 | Darms et al. | |
| 4,728,697 | A * | 3/1988 | Bolon | C08G 18/3821 525/424 |
| 5,243,024 | A * | 9/1993 | Bockrath et al. | 528/353 |
| 6,320,019 | B1 * | 11/2001 | Lee et al. | 528/353 |
| 2010/0273974 | A1 | 10/2010 | Yoshida et al. | |

FOREIGN PATENT DOCUMENTS

| | | | |
|---|---|---|---|
| EP | 1775316 | A1 * | 4/2007 |
| JP | 58101152 | A | 6/1983 |
| JP | 19940070136 | B2 | 5/1987 |
| JP | 19960003316 | A | 1/1996 |

OTHER PUBLICATIONS

Yang-Yen Yu, et al., "High transparent soluble polyimide/silica hybrid optical thin films," Polymer Testing, 29 (2010) pp. 33-40.

* cited by examiner

*Primary Examiner* — Ana Woodward
(74) *Attorney, Agent, or Firm* — Cantor Colburn LLP

(57) ABSTRACT

Disclosed are a polyimide precursor composition that includes a polyamic acid selected from compounds represented by Chemical Formulae 1 to 3, and a combination thereof; and a cross-linking agent selected from a compound represented by Chemical Formula 4, a compound represented by Chemical Formula 5, and a combination thereof; an article including a cross-linked polyimide using the same; and a display device including the article.

19 Claims, 1 Drawing Sheet

POLYIMIDE PRECURSOR COMPOSITION, ARTICLE PREPARED BY USING SAME, AND DISPLAY DEVICE INCLUDING THE ARTICLE

CROSS-REFERENCE TO RELATED APPLICATION

This application claims priority to Korean Patent Application No. 10-2012-0078652, filed on Jul. 19, 2012, and all the benefits accruing therefrom under 35 U.S.C. §119, the content of which in its entirety, is herein incorporated by reference.

BACKGROUND

1. Field

A polyimide precursor composition, an article prepared by using the same, and a display device including the article are disclosed.

2. Description of the Related Art

A colorless transparent material has been researched for diverse purposes such as for an optical lens, a functional optical film, and a disk substrate, but as information devices are being further miniaturized and display devices are providing higher resolution, more functions and greater performance are required from the material.

Therefore, a colorless material having excellent transparency, heat resistance, mechanical strength, and flexibility is continuously sought.

SUMMARY

An embodiment provides a polyimide precursor composition having excellent workability, and providing improved transparency, heat resistance, mechanical strength, and flexibility to the article made from the precursor composition.

Another embodiment provides an article including a cross-linked polyimide prepared from the polyimide precursor composition.

Yet another embodiment provides a display device including the article.

According to an embodiment, a polyimide precursor composition includes a polyamic acid selected from a compound represented by Chemical Formulae 1 to 3, and a combination thereof; and a cross-linking agent selected from a compound represented by Chemical Formula 4, a compound represented by Chemical Formula 5, and a combination thereof.

Chemical Formula 1

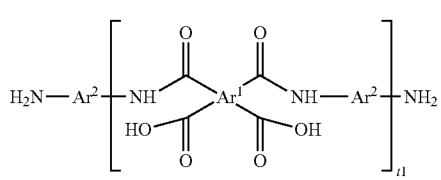

Chemical Formula 2

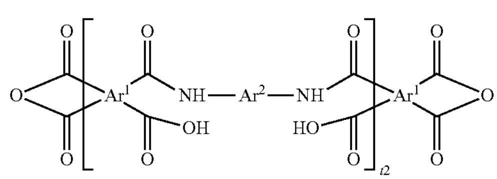

-continued

Chemical Formula 3

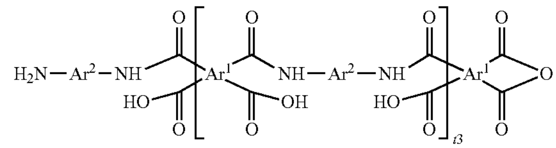

In Chemical Formulae 1 to 3, $Ar^1$ is the same or different in each repeating unit and is independently a substituted or unsubstituted tetravalent C3 to C30 alicyclic organic group, a substituted or unsubstituted tetravalent C6 to C30 aromatic organic group, or a substituted or unsubstituted tetravalent C2 to C30 heterocyclic group, wherein the alicyclic organic group, aromatic organic group, or heterocyclic group comprises one ring, two or more rings fused together to provide a condensed ring system, or two or more moieties independently selected from the foregoing linked through a single bond, —O—, —S—, —C(═O)—, —CH(OH)—, —$S(=O)_2$—, —$Si(CH_3)_2$—, —$(CH_2)_p$— wherein 1≤p≤10, —$(CF_2)_q$— wherein 1≤q≤10, —$C(CH_3)_2$—, —$C(CF_3)_2$—, or —C(═O)NH—.

$Ar^2$ is the same or different in each repeating unit, and is independently a substituted or unsubstituted divalent C3 to C30 alicyclic organic group, a substituted or unsubstituted divalent C6 to C30 aromatic organic group, a substituted or unsubstituted divalent C2 to C30 heterocyclic group, or a substituted or unsubstituted divalent fluorenyl group, wherein the alicyclic organic group, aromatic organic group, or heterocyclic group comprises one ring, two or more rings fused together to provide a condensed ring system, or two or more moieties independently selected from the foregoing linked to each other to provide a condensed ring; or two or more thereof are linked through a single bond, —O—, —S—, —C(═O)—, —CH(OH)—, —$S(=O)_2$—, —$Si(CH_3)_2$—, —$(CH_2)_p$— wherein 1≤p≤10, —$(CF_2)_q$— wherein 1≤q≤10, —$C(CH_3)_2$—, —$C(CF_3)_2$—, or —C(═O)NH—.

The t1, t2, and t3 are independently integers of greater than or equal to 2.

Chemical Formula 4

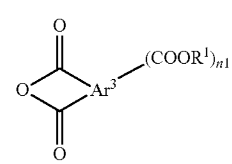

Chemical Formula 5

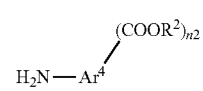

In Chemical Formulae 4 and 5, $Ar^3$ is a substituted or unsubstituted trivalent or higher valent C3 to C30 alicyclic organic group, a substituted or unsubstituted trivalent or higher valent C6 to C30 aromatic organic group, a substituted or unsubstituted trivalent or higher valent C2 to C30 heterocyclic group, or a functional group formed by combining the foregoing groups, wherein the alicyclic organic group, aromatic organic group, or heterocyclic group comprises one ring, two or more rings fused together to provide a condensed ring system, or two or more moieties independently selected from the foregoing linked through a single bond, —O—, —S—, —C(═O)—, —CH(OH)—, —S(═O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, or —C(═O)NH—.

Ar$^4$ is a substituted or unsubstituted divalent or higher valent C3 to C30 alicyclic organic group, a substituted or unsubstituted divalent or higher valent C6 to C30 aromatic organic group, a substituted or unsubstituted divalent or higher valent C2 to C30 heterocyclic group, or a functional group formed by combining the foregoing groups, wherein the alicyclic organic group, aromatic organic group, or heterocyclic group comprises one ring, two or more rings fused together to provide a condensed ring system, or two or more moieties independently selected from the foregoing linked through a single bond, —O—, —S—, —C(═O)—, —CH(OH)—, —S(═O)$_2$—, —Si(CH$_3$)$_2$—, —(CH$_3$)$_2$— wherein 1≤p≤10, —(CF$_2$)$_q$— wherein 1≤q≤10, —C(CH$_3$)$_2$—, —C(CF$_3$)$_2$—, or —C(═O)NH—.

R$^1$ and R$^2$ are the same or different, and are independently hydrogen, or a C1 to C30 alkyl group.

n1 is an integer of 1≤n1≤(valence number of Ar$^3$−2), and n2 is an integer of 1≤n2≤(valence number of Ar$^4$−1).

In an embodiment, Ar$^1$ may be the same or different in each repeating unit and may be independently selected from the following chemical formulae.

In the above chemical formulae,

X$^1$ to X$^8$ are the same or different and are independently a single bond, —O—, —S—, —C(═O)—, —CH(OH)—, —S(═O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, or —C(═O)NH—, Z$^1$ is —O—, —S—, or —NR$^{300}$—, wherein R$^{300}$ is hydrogen or a C1 to C5 alkyl group, Z$^2$ and Z$^3$ are the same or different and are independently —N═ or —C(R$^{301}$)═ wherein R$^{301}$ is hydrogen or a C1 to C5 alkyl group, provided that Z$^2$ and Z$^3$ are not simultaneously —C(R$^{301}$)═, R$^{30}$ to R$^{50}$ and R$^{54}$ to R$^{60}$ are the same or different and are independently a halogen, a substituted or unsubstituted C1 to C10 aliphatic organic group, or a substituted or unsubstituted C6 to C20 aromatic organic group, R$^{51}$ to R$^{53}$ are the same or different and are independently hydrogen, a halogen, a substituted or unsubstituted C1 to C10 aliphatic organic group, or a substituted or unsubstituted C6 to C20 aromatic organic group, k30, k31, and k32 are independently integers ranging from 0 to 2, k33, k35, k36, k37, k39, k42, k43, k44, k46, k54, and k57 are independently integers ranging from 0 to 3, k34 is an integer of 0 or 1, k38, k45, k50, k55, and k56 are independently integers ranging from 0 to 4,

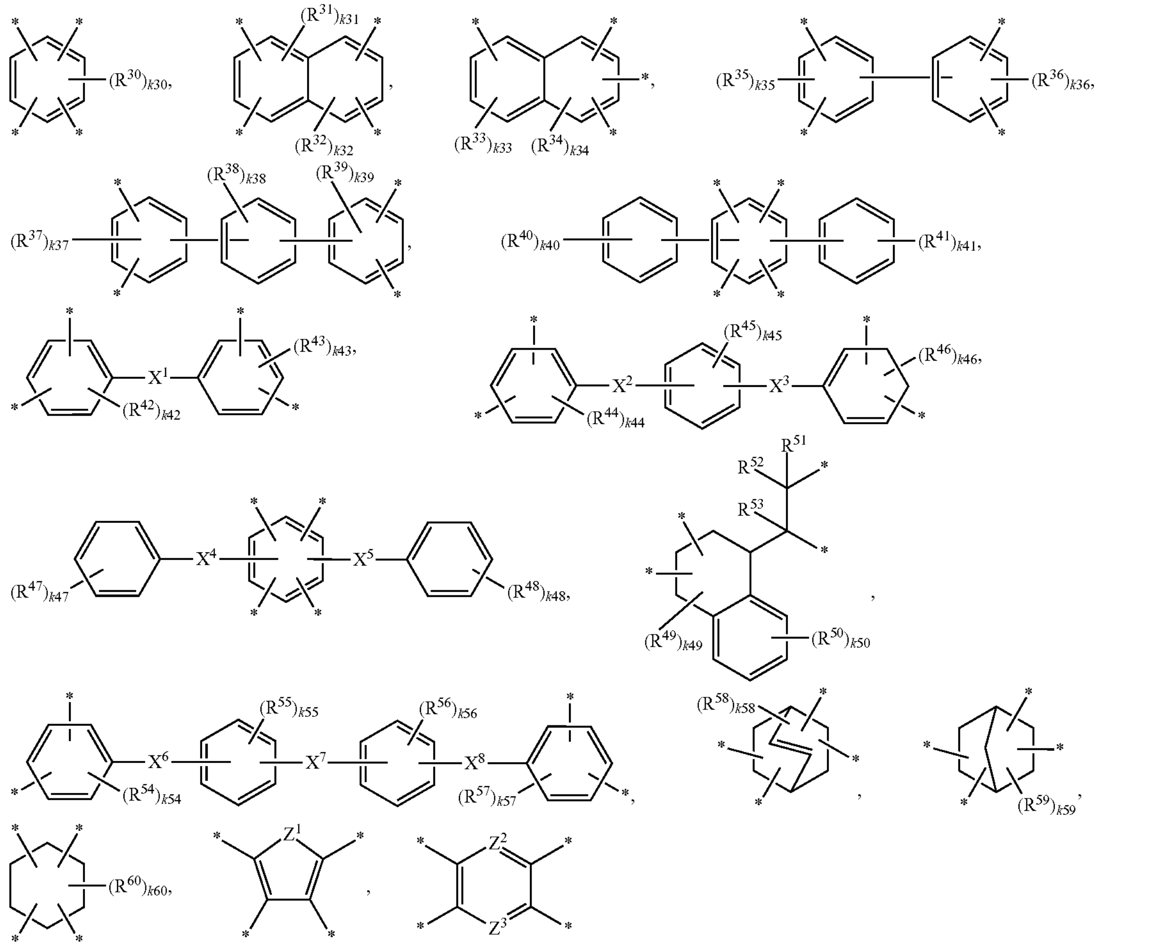

k40, k41, k47, k48, and k49 are independently integers ranging from 0 to 5, and
k58, k59, and k60 are independently integers ranging from 0 to 8.
In another embodiment, $Ar^1$ may be the same or different in each repeating unit and may be independently selected from the following chemical formulae.
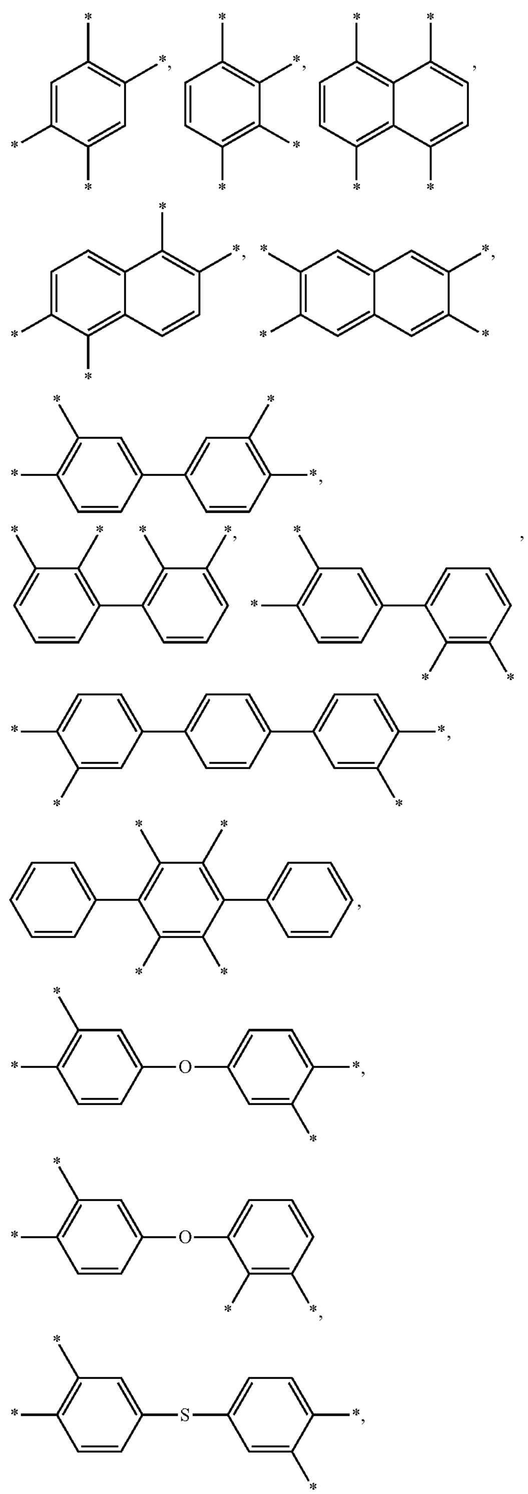
-continued
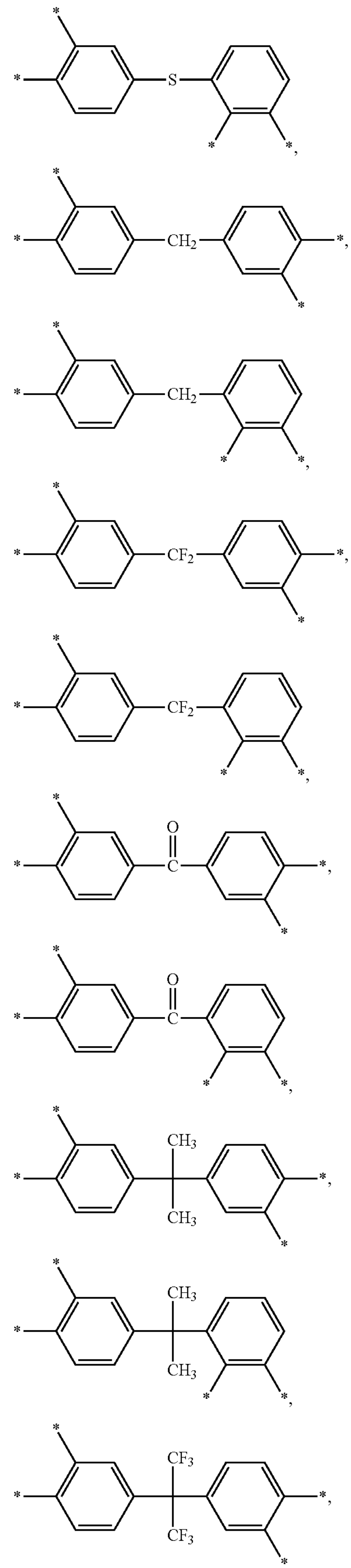

-continued
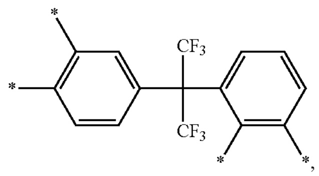
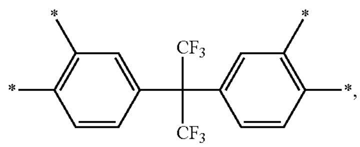
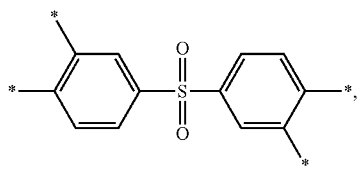
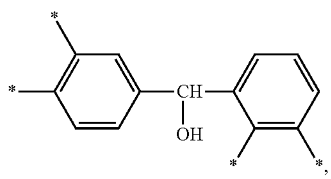
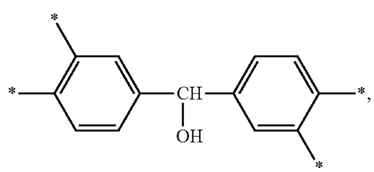
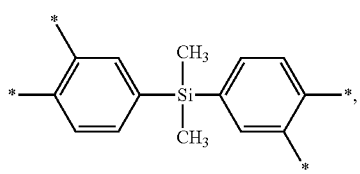
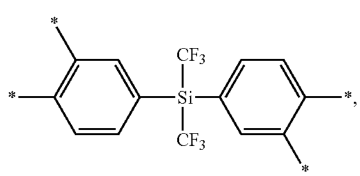
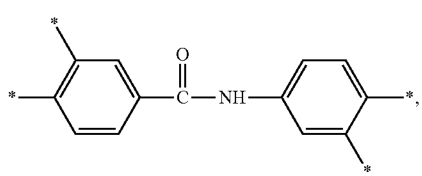
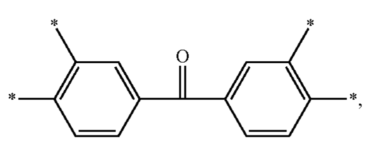
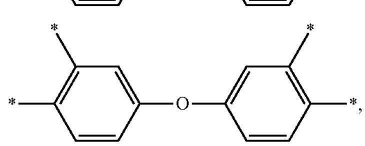
-continued
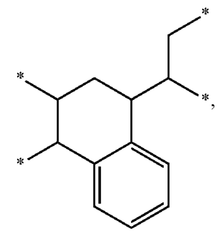
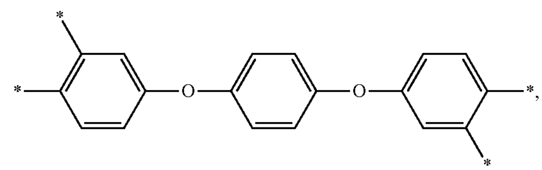
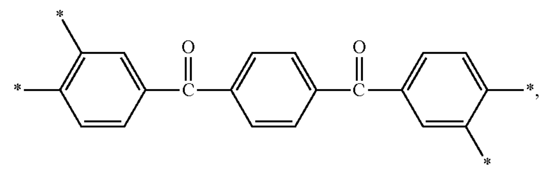
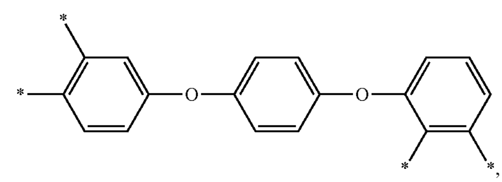
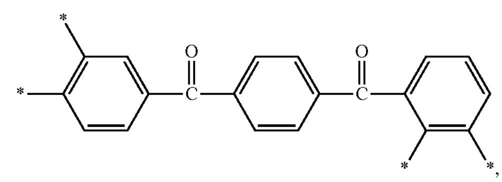
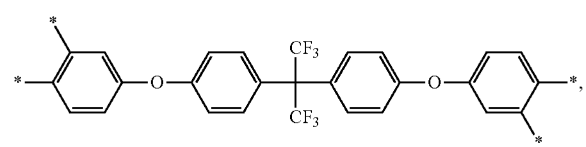
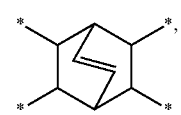
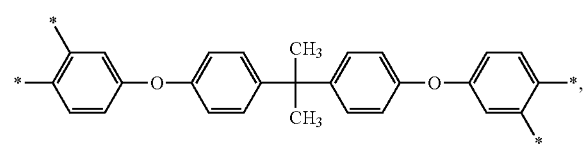
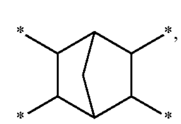
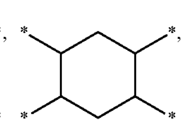
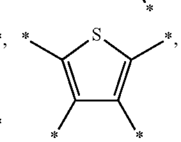
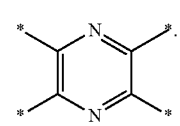
In an embodiment, $Ar^2$ may be the same or different in each repeating unit and may be independently selected from the following chemical formulae.

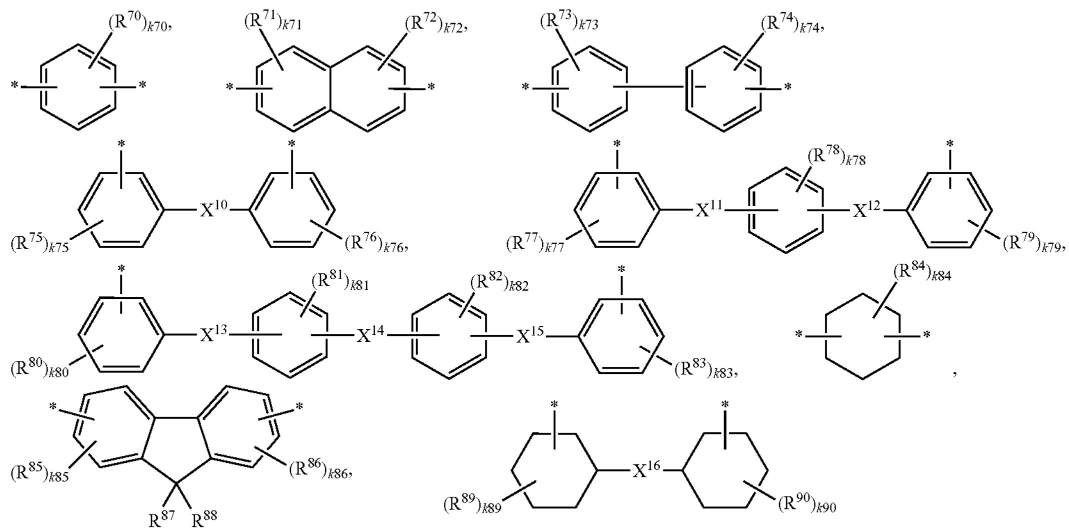

In the above chemical formulae, $X^{10}$ to $X^{16}$ are the same or different and are independently a single bond, —O—, —S—, —C(=O)—, —CH(OH)—, —$S(=O)_2$—, —$Si(CH_3)_2$—, —$(CH_2)_p$— (wherein $1 \leq p \leq 10$), —$(CF_2)_q$— wherein $1 \leq q \leq 10$, —$C(CH_3)_2$—, —$C(CF_3)_2$—, or —C(=O)NH—, $R^{70}$ to $R^{86}$ and $R^{89}$ to $R^{90}$ are the same or different and are independently a halogen, a substituted or unsubstituted C1 to C10 aliphatic organic group, or a substituted or unsubstituted C6 to C20 aromatic organic group, $R^{87}$ and $R^{88}$ are the same or different and are independently hydrogen, a halogen, a substituted or unsubstituted C1 to C10 aliphatic organic group, or a substituted or unsubstituted C6 to C20 aromatic organic group, k70, k73, k74, k75, k76, k77, k78, k79, k80, k81, k82, and k83 are independently integers ranging from 0 to 4, k71, k72, k85, and k86 are independently integers ranging from 0 to 3, and k84, k89, and k90 are independently integers ranging from 0 to 10.

In another embodiment, $Ar^2$ may be the same or different in each repeating unit and may be independently selected from the following chemical formulae.

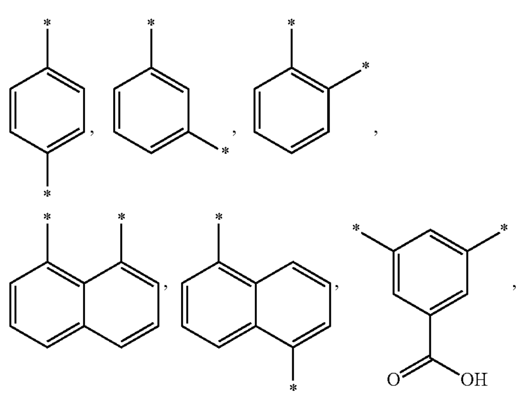

-continued

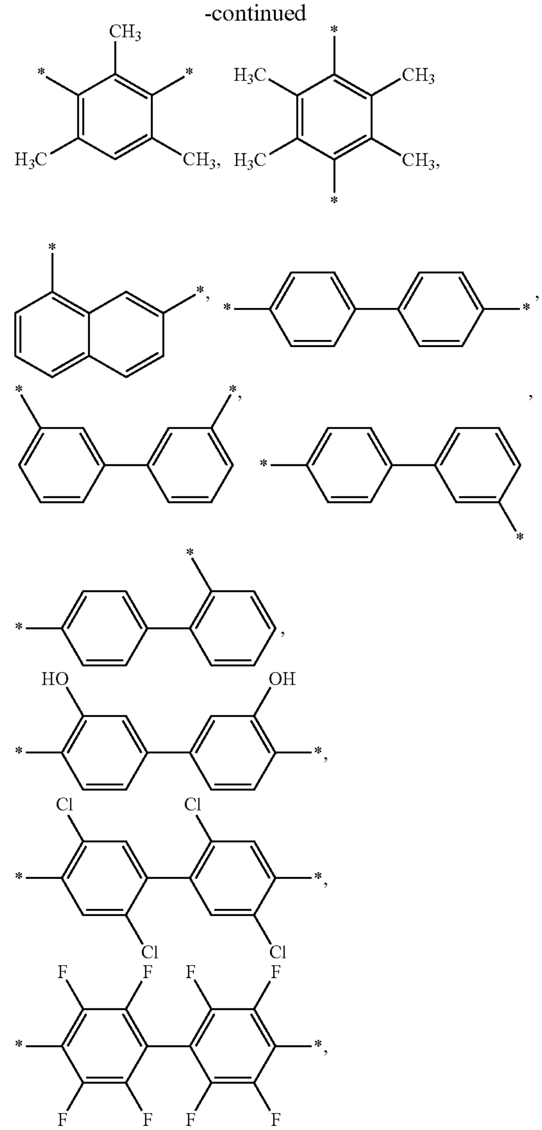

-continued
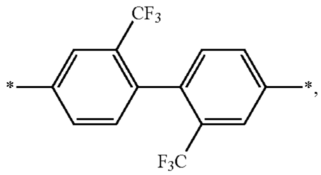
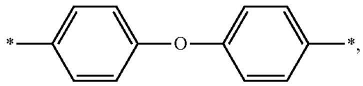
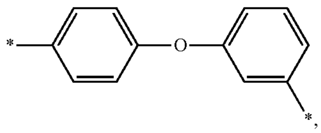
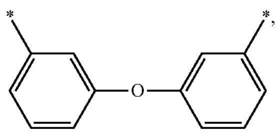
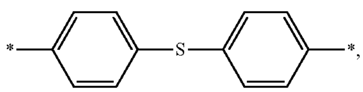
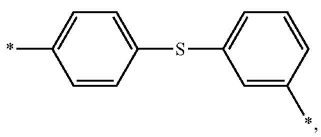
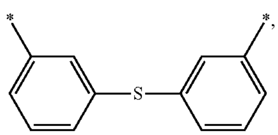
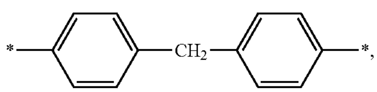
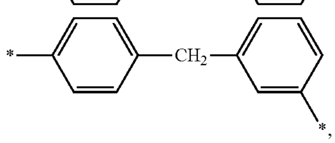
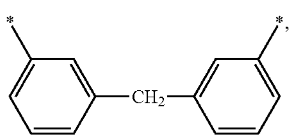
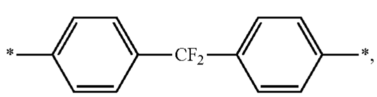
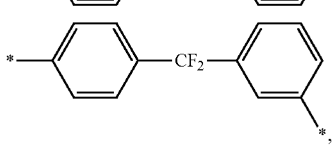
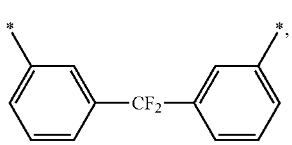
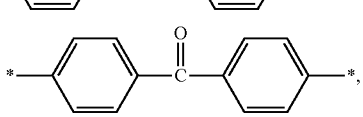
-continued
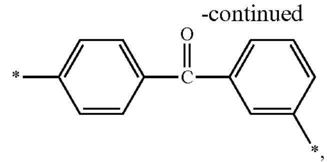
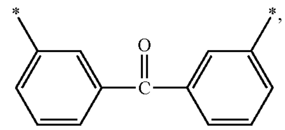
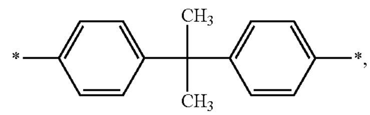
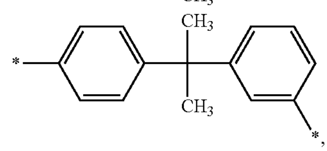
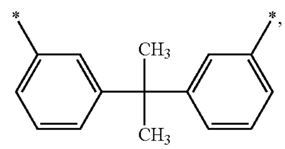
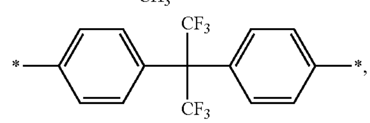
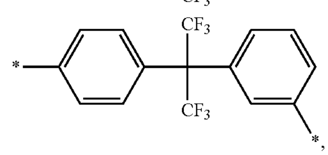
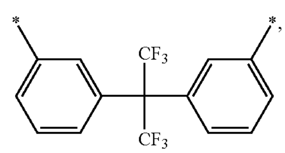
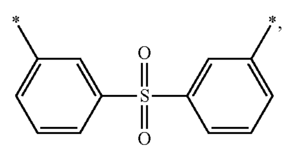
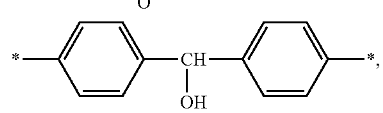
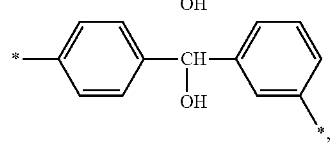
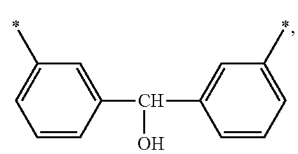
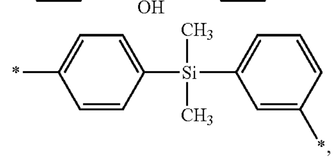

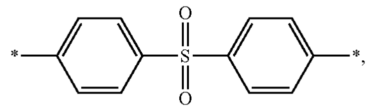
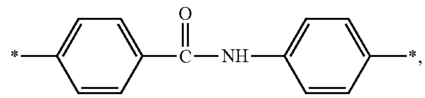
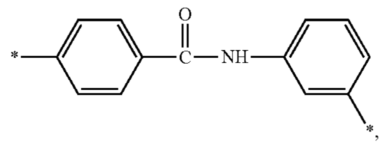
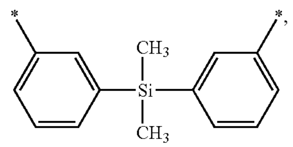
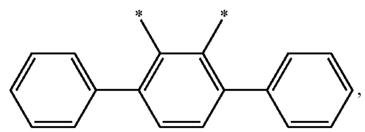
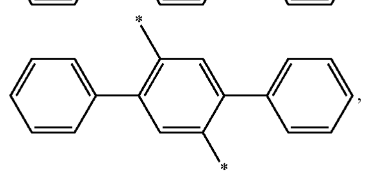
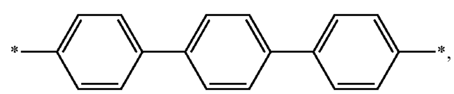
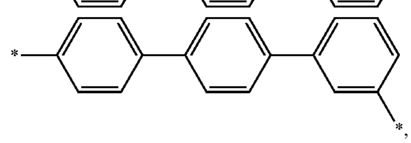
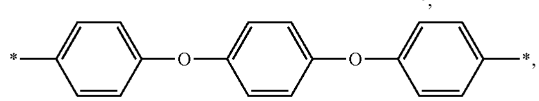
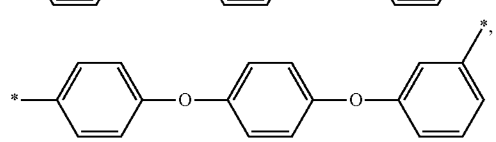
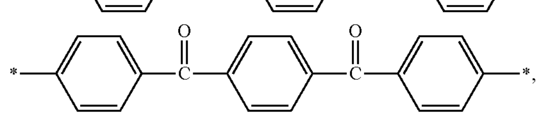
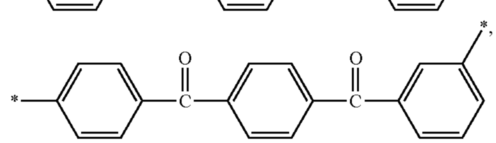
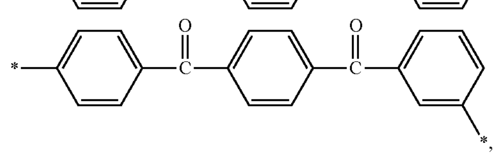
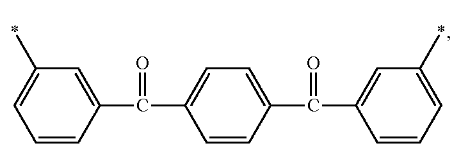
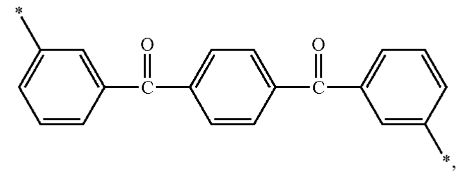
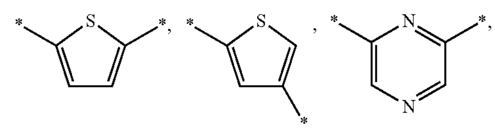
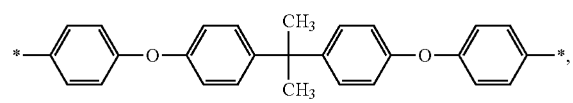
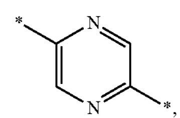
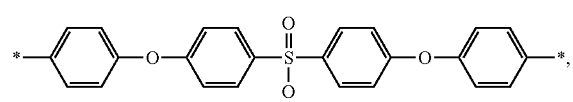
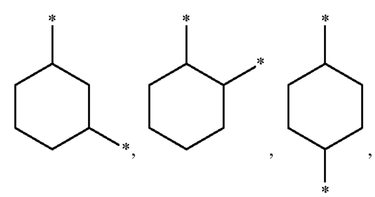
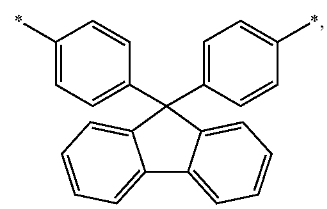
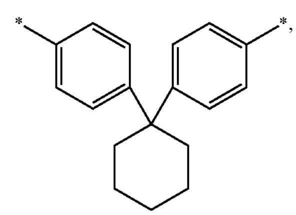
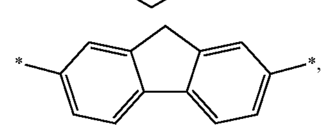
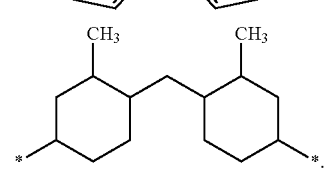
The cross-linking agent may include a compound selected from the following chemical formulae.

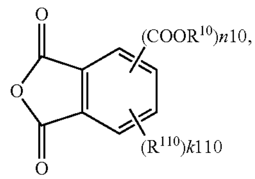

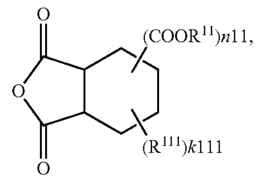

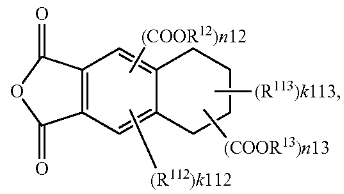

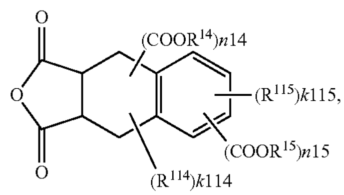

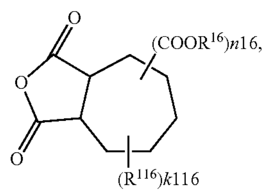

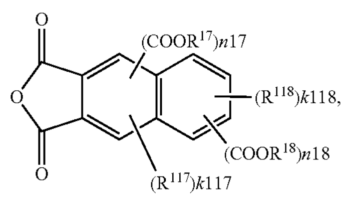

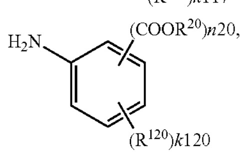

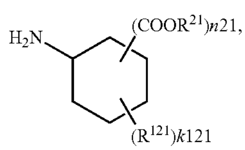

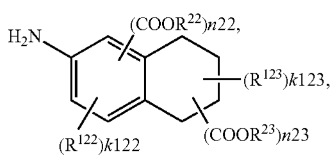

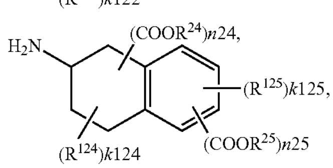

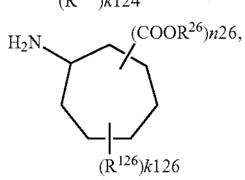

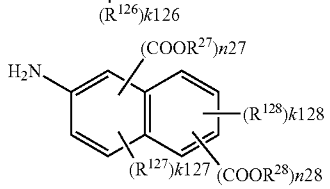

In the above chemical formulae, $R^{10}$ to $R^{18}$ and $R^{20}$ to $R^{28}$ are the same or different and are independently hydrogen, or a C1 to C30 alkyl group, n10 is an integer ranging from 1 to 4, n11 is an integer ranging from 1 to 10, n12 is an integer ranging from 0 to 2, n13 is an integer ranging from 0 to 8, provided that n12+n13 is an integer of greater than or equal to 1, n14 is an integer ranging from 0 to 6, n15 is an integer ranging from 0 to 4, provided that n14+n15 is an integer of greater than or equal to 1, n16 is an integer ranging from 1 to 12, n17 is an integer ranging from 0 to 2, n18 is an integer ranging from 0 to 4, provided that n17+n18 is an integer of greater than or equal to 1, n20 is an integer ranging from 1 to 5, n21 is an integer ranging from 1 to 11, n22 is an integer ranging from 0 to 3, n23 is an integer ranging from 0 to 8, provided that n22+n23 is an integer of greater than or equal to 1, n24 is an integer ranging from 0 to 7, n25 is an integer ranging from 0 to 4, provided that n24+n25 is an integer of greater than or equal to 1, n26 is an integer ranging from 1 to 13, n27 is an integer ranging from 0 to 3, n28 is an integer ranging from 0 to 4, provided that n27+n28 is an integer of greater than or equal to 1, $R^{110}$ to $R^{118}$ and $R^{120}$ to $R^{128}$ are the same or different and are independently a halogen, a substituted or unsubstituted C1 to C10 aliphatic organic group, or a substituted or unsubstituted C6 to C20 aromatic organic group, k110 is an integer ranging from 0 to 3, k111 is an integer ranging from 0 to 9, k112 is an integer ranging from 0 to 2, k113 is an integer ranging from 0 to 8, provided that k112+k113 is an integer ranging from 0 to 9, k114 is an integer ranging from 0 to 6, k115 is an integer ranging from 0 to 4, provided that k114+k115 is an integer ranging from 0 to 9, k116 is an integer ranging from 0 to 11, k117 is an integer ranging from 0 to 2, k118 is an integer ranging from 0 to 4, provided that k117+k118 is an integer ranging from 0 to 5, k120 is an integer ranging from 0 to 4, k121 is an integer ranging from 0 to 10, k122 is an integer ranging from 0 to 3, k123 is an integer ranging from 0 to 8, provided that k122+k123 is an integer ranging from 0 to 10, k124 is an integer ranging from 0 to 7, k125 is an integer ranging from 0 to 4, provided that k124+k125 is an integer ranging from 0 to 10, k126 is an integer ranging from 0 to 12, and k127 is an integer ranging from 0 to 3, k128 is an integer ranging from 0 to 4, provided that k127+k128 is an integer ranging from 0 to 6.

In another embodiment, the cross-linking agent may include a compound selected from the following chemical formulae.

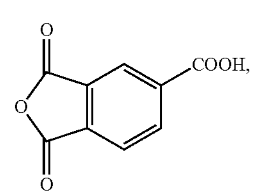

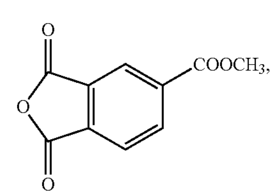

-continued

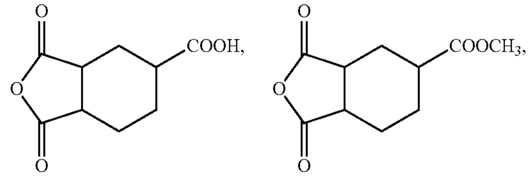

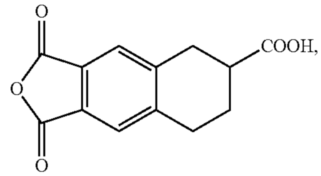

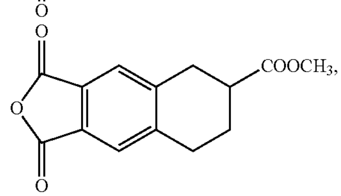

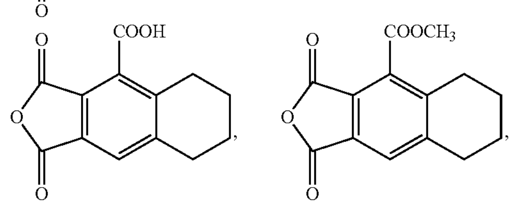

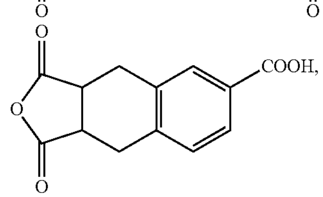

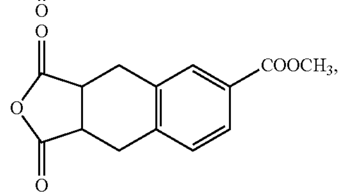

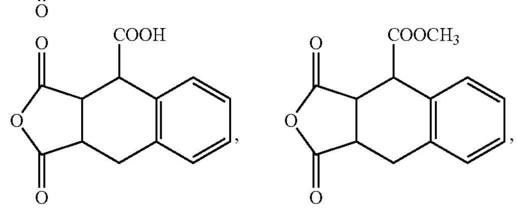

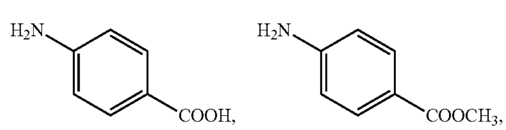

-continued

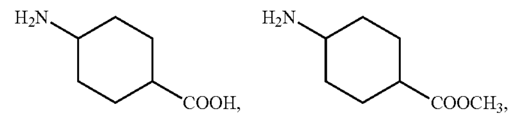

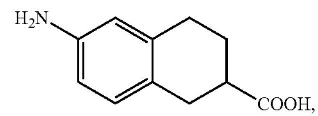

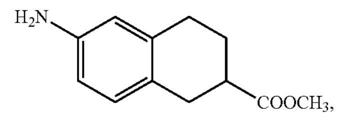

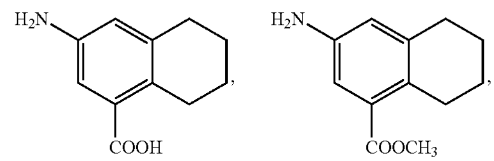

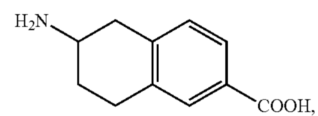

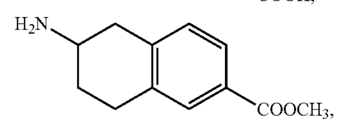

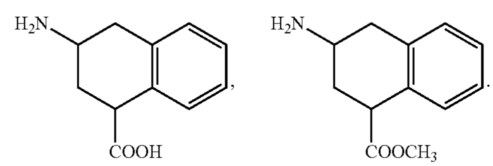 [SMILES: NC1Cc2ccccc2C(C(=O)O)C1 ; COC(=O)C1CC(N)Cc2ccccc21]

The polyamic acid may include a compound selected from a compound represented by the following Chemical Formula 1-1, a compound represented by the following Chemical Formula 1-2, a compound represented by the following Chemical Formula 2-1, a compound represented by the following Chemical Formula 2-2, a compound represented by the following Chemical Formula 3-1, a compound represented by the following Chemical Formula 3-2, and a combination thereof, and the cross-linking agent may include a compound selected from compounds represented by the following Chemical Formulae 4-1 to 4-6, compounds represented by the following Chemical Formulae 5-1 to 5-6, and a combination thereof.

Chemical Formula 1-1

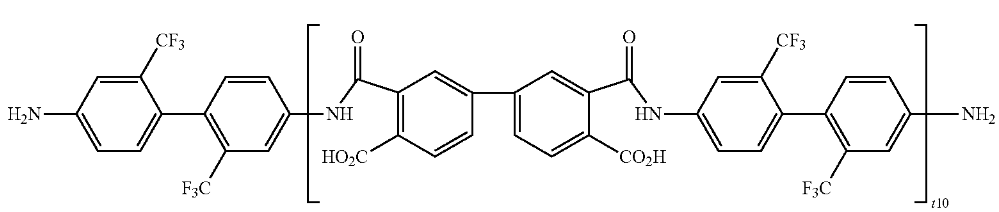

-continued
Chemical Formula 1-2
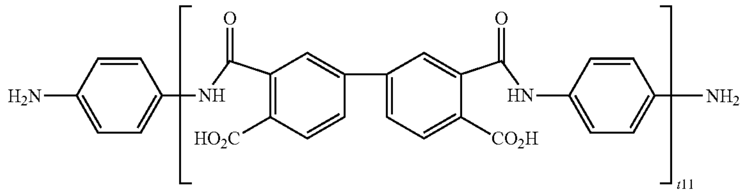
Chemical Formula 2-1
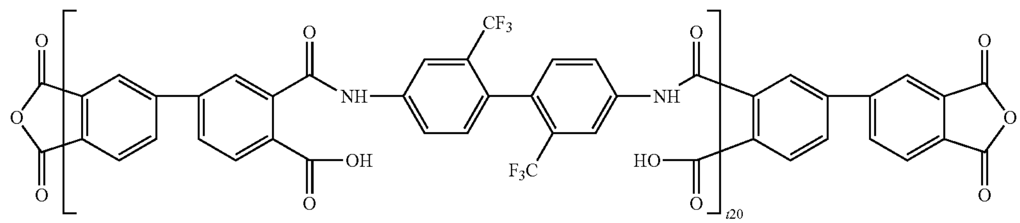
Chemical Formula 2-2
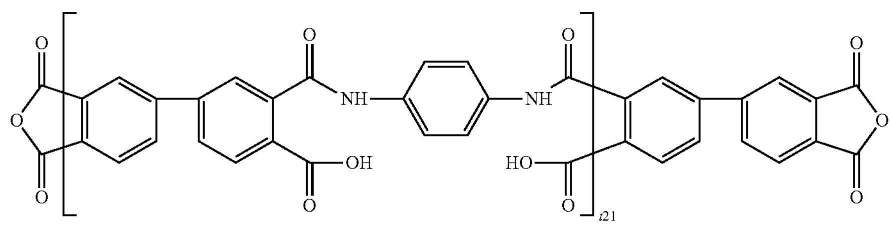
Chemical Formula 3-1
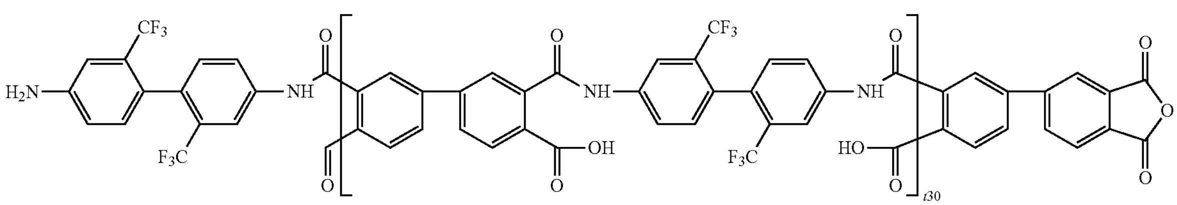
Chemical Formula 3-2
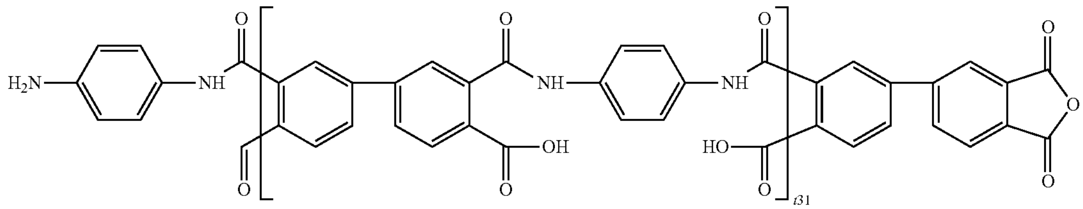

In Chemical Formulae 1-1, 1-2, 2-1, 2-2, 3-1, and 3-2, t10, t11, t20, t21, t30, and t31 are independently integers of greater than or equal to 2.

Chemical Formula 4-1 and Chemical Formula 4-2

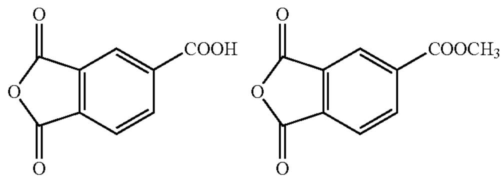

Chemical Formula 4-3 and Chemical Formula 4-4

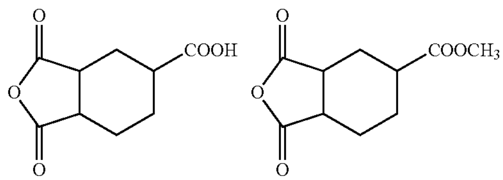

Chemical Formula 4-5 and Chemical Formula 4-6

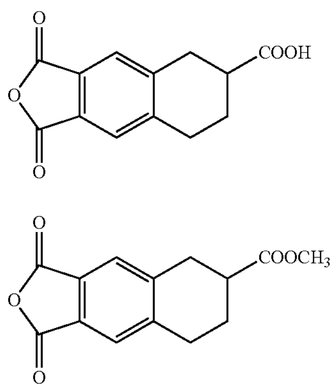

Chemical Formula 5-1 and Chemical Formula 5-2

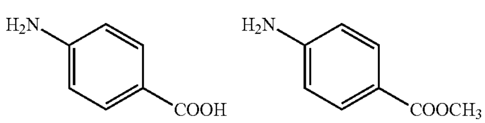

Chemical Formula 5-3 and Chemical Formula 5-4

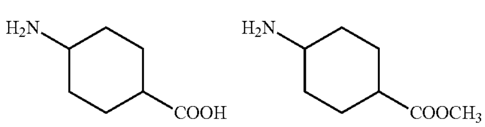

-continued

Chemical Formula 5-5 and Chemical Formula 5-6

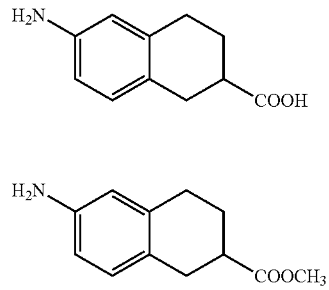

In the polyimide precursor composition, the cross-linking agent may be present in an amount of greater than about 0 mol % and less than or equal to about 5 mol % based on the sum of 100 mol % of the dianhydride and the diamine used for preparing the polyamic acid the cross-linking agent.

For example, the polyimide precursor composition may include polyamic acid including a compound represented by the above Chemical Formula 1, and a cross-linking agent including a compound represented by the above Chemical Formula 4.

Herein, the polyimide precursor composition may satisfy the following Equation 1.

$$A_1+C_1=B_1 \quad \text{Equation 1}$$

In Equation 1, $A_1$ is a mole number of the dianhydride used for preparing the compound represented by the above Chemical Formula 1, $B_1$ is a mole number of the diamine used for preparing the compound represented by the above Chemical Formula 1, $C_1$ is a mole number of the cross-linking agent, and $C_1$ is greater than about 0 mol % and less than equal to about 5 mol % based on the total amount of 100 mol % of $A_1+B_1+C_1$.

The polyamic acid may have an intrinsic viscosity of about 0.1 dL/g to about 2.0 dL/g.

The polyimide precursor composition may have a viscosity of about 10 cps to about 30,000 cps.

Polyamic acid according to another embodiment includes a compound selected from a compound represented by the Chemical Formula 1, a compound represented by the Chemical Formula 6, a compound represented by the Chemical Formula 7, and a combination thereof.

Chemical Formula 1

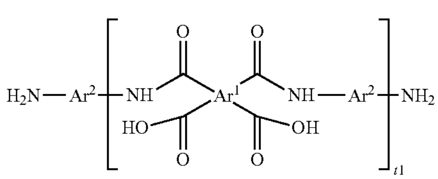

-continued

Chemical Formula 6

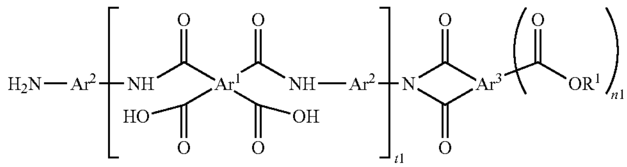

Chemical Formula 7

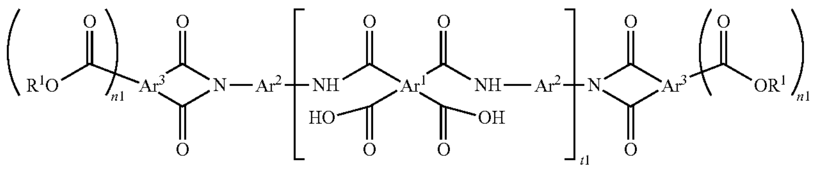

In Chemical Formulae 1, 6, and 7, $Ar^1$, $Ar^2$, and t1 are the same as described in Chemical Formulae 1 to 3, and $Ar^3$, $R^1$, and n1 are the same as described in Chemical Formula 4.

A polyimide precursor according to another embodiment includes a repeating unit represented by the following Chemical Formula 8.

Chemical Formula 8

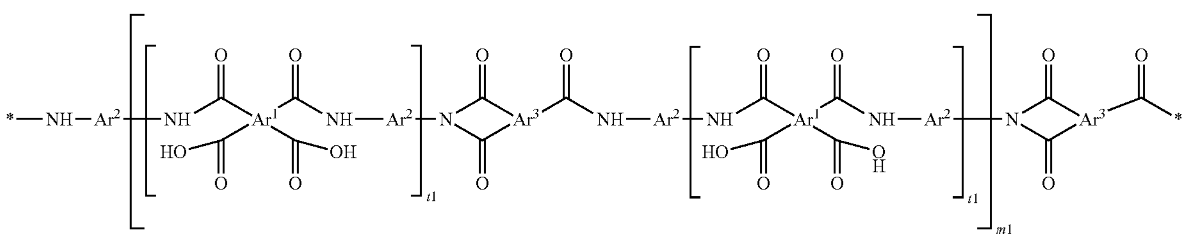

In Chemical Formula 8, $Ar^1$, $Ar^2$, and t1 are the same as described in Chemical Formulae 1 to 3, $Ar^3$ is the same as described in Chemical Formulae 4, and m1 is an integer of greater than or equal to 1.

According to another embodiment, an article including a cross-linked polyimide prepared from a composition selected from the polyimide precursor composition, the polyamic acid, and the polyimide precursor is provided.

The cross-linked polyimide may be a polyimide selected from compounds represented by the following Chemical Formulae 9 to 11, and a combination thereof that is cross-linked through an amide bond by using a cross-linking agent selected from the compound represented by the above Chemical Formula 4, the compound represented by the above Chemical Formula 5, and a combination thereof.

Chemical Formula 9

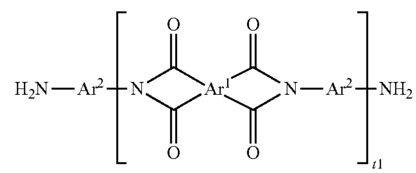

-continued

Chemical Formula 10

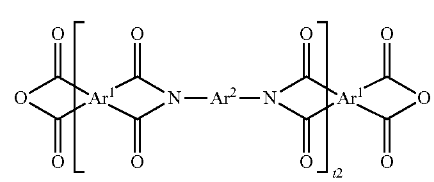

Chemical Formula 11

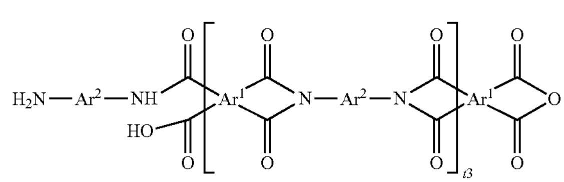

In Chemical Formulae 9 to 11, $Ar^1$, $Ar^2$, t1, t2, and t3 are the same as described in Chemical Formulae 1 to 3.

In an embodiment, the cross-linked polyimide may include a repeating unit represented by the following Chemical Formula 12.

Chemical Formula 12

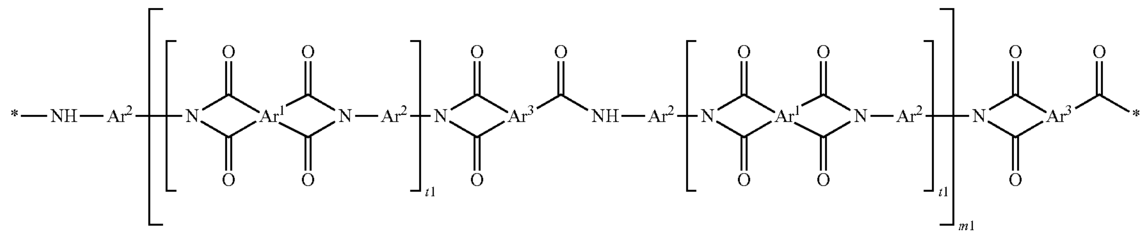

In Chemical Formula 12, $Ar^1$, $Ar^2$, and t1 are the same as described in Chemical Formulae 1 to 3, $Ar^3$ is the same as described in Chemical Formula 4, and m1 is an integer of greater than or equal to 1.

The cross-linked polyimide may have a weight average molecular weight (Mw) of about 1000 g/mol to about 100000 g/mol.

The article may be a film, a fiber, a coating material, or an adhesive.

The article may have a light transmittance of greater than or equal to about 45% at a wavelength of about 400 nm.

According to yet another embodiment, a display device including the article is provided.

DETAILED DESCRIPTION

Figure 1:
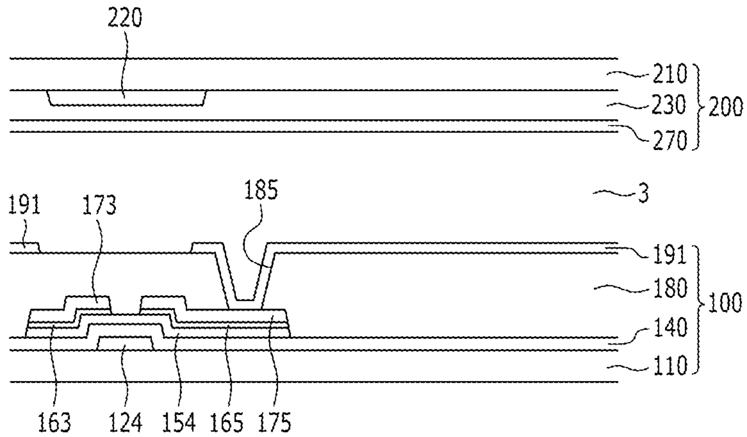
FIG. 1 is a cross-sectional view of a liquid crystal display (LCD) according to an embodiment.

This disclosure will be described more fully hereinafter with reference to the accompanying drawings, in which embodiments are shown. This disclosure may, however, be embodied in many different forms and is not to be construed as limited to the exemplary embodiments set forth herein.

It will be understood that when an element is referred to as being "on" another element, it may be directly on the other element or intervening elements may be present therebetween. In contrast, when an element is referred to as being "directly on" another element, there are no intervening elements present. It will be understood that, although the terms first, second, third etc. may be used herein to describe various elements, components, regions, layers and/or sections, there elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a", "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may typically have rough and/or nonlinear features.

Moreover, sharp angles that are illustrated may be rounded. Thus, the regions illustrated in the figures are schematic in nature and their shapes are not intended to illustrate the precise shape of a region and are not intended to limit the scope of the present claims.

As used herein, when a specific definition is not otherwise provided, the term "substituted" refers to a group or compound substituted with at least one substituent including a halogen such as —F, —Br, —Cl, or —I, a hydroxyl group, a nitro group, a cyano group, an amino group ($NH_2$, $NH(R^{100})$ or $N(R^{101})(R^{102})$, wherein $R^{100}$, $R^{101}$, and $R^{102}$ are the same or different, and are each independently a C1 to C10 alkyl group), an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, in place of at least one hydrogen of a functional group, or the substituents may be linked to each other to provide a ring.

As used herein, when a specific definition is not otherwise provided, the term "alkyl group" may refer to a C1 to C30 alkyl group, and specifically a C1 to C15 alkyl group, the term "cycloalkyl group" may refer to a C3 to C30 cycloalkyl group, and specifically a C3 to C18 cycloalkyl group, the term "alkoxy group" may refer to a C1 to C30 alkoxy group, and specifically a C1 to C18 alkoxy group, the term "ester group" may refer to a C2 to C30 ester group, and specifically a C2 to C18 ester group, the term "ketone group" may refer to a C2 to C30 ketone group, and specifically a C2 to C18 ketone group, the term "aryl group" may refer to a C6 to C30 aryl group, and specifically a C6 to C18 aryl group, the term "alkenyl group" may refer to a C2 to C30 alkenyl group, and specifically a C2 to C18 alkenyl group, the term "alkylene group" may refer to a C1 to C30 alkylene group, and specifically a C1 to C18 alkylene group, and the term "arylene group" may refer to a C6 to C30 arylene group, and specifically a C6 to C16 arylene group.

As used herein, when a specific definition is not otherwise provided, the term "aliphatic" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, specifically a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, specifically a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group, the term "aromatic organic group" refers to a C6 to C30 aryl group or a C6 to C30 arylene group, specifically a C6 to C16 aryl group or a C6 to C16 arylene group, and the term "hetero cyclic group" refers to a C2 to C30 cycloalkyl group, a C2 to C30 cycloalkylene group, a C2 to C30 cycloalkenyl group, a C2 to C30 cycloalkenylene group, a C2 to C30 cycloalkynyl group, a C2 to C30 cycloalkynylene group, a C2 to C30 heteroaryl group, or a C2 to C30 heteroarylene group including 1 to 3 heteroatoms selected from O, S, N, P, Si, and a combination thereof in one ring, specifically a C2 to C15 cycloalkyl group, a C2 to C15 cycloalkylene group, a C2 to C15 cycloalkenyl group, a C2 to C15 cycloalkenylene group, a C2 to C15 cycloalkynyl group, a C2 to C15 cycloalkynylene group, a C2 to C15 heteroaryl group, or a C2 to C15 heteroarylene group including 1 to 3 heteroatoms selected from O, S, N, P, Si, and a combination thereof, in one ring.

As used herein, when a definition is not otherwise provided, "combination" refers to mixing or copolymerization.

The term "copolymerization" may refer to block copolymerization, random copolymerization, or graft copolymerization, and the term "copolymer" may refer to a block copolymer, a random copolymer, or a graft copolymer.

In addition, in the specification, the mark "*" may refer to where a point of attachment to another atom.

A polyimide precursor composition according to an embodiment includes a polyamic acid including a repeating unit prepared from a dianhydride and a diamine, wherein the polyamic acid includes a compound selected from compounds represented by the following Chemical Formulae 1 to 3, and a combination thereof; and a cross-linking agent including a compound selected from a compound represented by the following Chemical Formula 4, a compound represented by the following Chemical Formula 5, and a combination thereof.

Chemical Formula 1

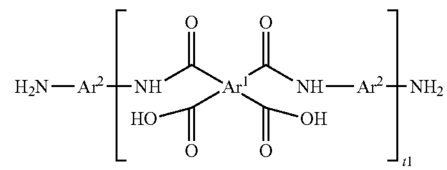

Chemical Formula 2

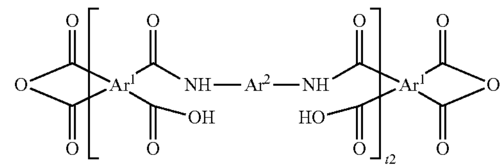

Chemical Formula 3

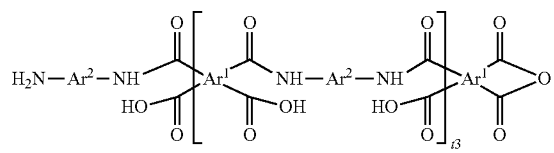

In Chemical Formulae 1 to 3, $Ar^1$ is the same or different in each repeating unit and are independently a substituted or unsubstituted tetravalent C3 to C30 alicyclic organic group, a substituted or unsubstituted tetravalent C6 to C30 aromatic organic group, or a substituted or unsubstituted tetravalent C2 to C30 heterocyclic group, wherein the alicyclic organic group, aromatic organic group, or heterocyclic group comprises one ring, two or more rings fused together to provide a condensed ring system, or two or more moieties independently selected from the foregoing linked through a single bond, —O—, —S—, —C(=O)—, —CH(OH)—, $—S(=O)_2—$, $—Si(CH_3)_2—$, $—(CH_2)_p—$ wherein $1 \leq p \leq 10$, $—(CF_2)_q—$ wherein $1 \leq q \leq 10$, $—C(CH_3)_2—$, $—C(CF_3)_2—$, or —C(=O)NH—.

In an embodiment, $Ar^1$ may be the same or different in each repeating unit, and may independently be a substituted or unsubstituted tetravalent C3 to C20 alicyclic organic group, a substituted or unsubstituted tetravalent C6 to C20 aromatic organic group, or a substituted or unsubstituted tetravalent C2 to C20 heterocyclic group, and in another embodiment, $Ar^1$ may be a substituted or unsubstituted tetravalent C3 to C15 alicyclic organic group, a substituted or unsubstituted tetravalent C6 to C15 aromatic organic group, or a substituted or unsubstituted tetravalent C2 to C15 heterocyclic group.

$Ar^2$ is the same or different in each repeating unit, and are independently a substituted or unsubstituted divalent C3 to C30 alicyclic organic group, a substituted or unsubstituted divalent C6 to C30 aromatic organic group, a substituted or unsubstituted divalent C2 to C30 heterocyclic group, or a substituted or unsubstituted divalent fluorenyl group, wherein the alicyclic organic group, aromatic organic group, or heterocyclic group comprises one ring, two or more rings fused together to provide a condensed ring system, or two or more moieties independently selected from the foregoing linked through a single bond, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, or —C(=O)NH—.

In an embodiment, $Ar^2$ may be the same or different in each repeating unit, and may independently be a substituted or unsubstituted divalent C3 to C20 alicyclic organic group, a substituted or unsubstituted divalent C6 to C20 aromatic organic group, a substituted or unsubstituted divalent C2 to C20 heterocyclic group, or a substituted or unsubstituted divalent fluorenyl group, and in another embodiment, $Ar^2$ may be a substituted or unsubstituted divalent C3 to C15 alicyclic organic group, a substituted or unsubstituted divalent C6 to C15 aromatic organic group, a substituted or unsubstituted divalent C2 to C15 heterocyclic group, or a substituted or unsubstituted divalent fluorenyl group.

The t1, t2, and t3 are independently integers of greater than or equal to 2, specifically 3 to 10,000, and more specifically 10 to 500.

Chemical Formula 4

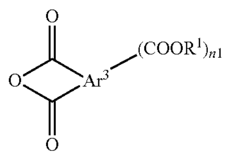

Chemical Formula 5

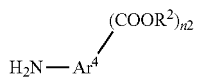

In Chemical Formulae 4 and 5, $Ar^3$ and $Ar^4$ are the same or different, and $Ar^3$ is a substituted or unsubstituted trivalent or higher valent C3 to C30 alicyclic organic group, a substituted or unsubstituted trivalent or higher valent C6 to C30 aromatic organic group, a substituted or unsubstituted trivalent or higher valent C2 to C30 heterocyclic group, or a functional group formed by combining the foregoing groups, wherein the alicyclic organic group, aromatic organic group, or heterocyclic group comprises one ring, two or more rings fused together to provide a condensed ring system, or two or more moieties independently selected from the foregoing linked through a single bond, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, or —C(=O)NH—. $Ar^4$ is a substituted or unsubstituted divalent or higher valent C3 to C30 alicyclic organic group, a substituted or unsubstituted divalent or higher valent C6 to C30 aromatic organic group, a substituted or unsubstituted divalent or higher valent C2 to C30 heterocyclic group, or a functional group formed by combining the foregoing groups, wherein the alicyclic organic group, aromatic organic group, or heterocyclic group comprises one ring, two or more rings fused together to provide a condensed ring system, or two or more moieties independently selected from the foregoing linked through a single bond, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, or —C(=O)NH—, In an embodiment, $Ar^3$ and $Ar^4$ may be the same or different, and $Ar^3$ is a substituted or unsubstituted trivalent or higher valent C3 to C20 alicyclic organic group, a substituted or unsubstituted trivalent or higher valent C6 to C20 aromatic organic group, a substituted or unsubstituted trivalent or higher valent C2 to C20 heterocyclic group, or a functional group formed by combining the foregoing groups, $Ar^4$ is a substituted or unsubstituted divalent or higher valent C3 to C20 alicyclic organic group, a substituted or unsubstituted divalent or higher valent C6 to C20 aromatic organic group, a substituted or unsubstituted divalent or higher valent C2 to C20 heterocyclic group, or a functional group formed by combining the foregoing groups, and in another embodiment, $Ar^3$ may be a substituted or unsubstituted trivalent or higher valent C3 to C10 alicyclic organic group, a substituted or unsubstituted trivalent or higher valent C6 to C15 aromatic organic group, a substituted or unsubstituted trivalent or higher valent C2 to C15 heterocyclic group, or a functional group formed by combining the foregoing groups, and $Ar^4$ a substituted or unsubstituted divalent or higher valent C3 to C10 alicyclic organic group, a substituted or unsubstituted divalent or higher valent C6 to C15 aromatic organic group, a substituted or unsubstituted divalent or higher valent C2 to C15 heterocyclic group, or a functional group formed by combining the foregoing groups.

$R^1$ and $R^2$ are the same or different, and are independently hydrogen or a C1 to C30 alkyl group, in one embodiment hydrogen or a C1 to C20 alkyl group, in another embodiment hydrogen or a C1 to C10 alkyl group, and in yet another embodiment hydrogen, a methyl group, or an ethyl group.

n1 is an integer of 1≤n1≤(valence number of $Ar^3$−2), specifically an integer of 1 to 3, and more specifically an integer of 1 or 2.

n2 is an integer of 1≤n2≤(valence number of $Ar^4$−1), specifically an integer of 1 to 3, and more specifically an integer of 1 or 2.

The polyimide precursor composition may have desirable viscosity and thus may be processed easily.

The cross-linking agent of the polyimide precursor composition may react with a terminal amine group or a terminal anhydride group of the polyamic acid or polyimide to form a cross-link through an amide bond during formation of the polyamic acid, imidization of the polyamic acid, or an additional separate process when an article is prepared using the polyimide precursor composition, and thus the polyamic acid or polyimide does not include an amine group or an anhydride group at its terminal end.

Thereby, the article prepared using the polyimide precursor composition may have improved optical properties, mechanical strength, and heat resistance.

The cross-linking agent of the polyimide precursor composition may provide an appropriate weight average molecular weight and number average molecular weight of polyimide prepared using the polyamic acid, and an article including the polyimide may have improved optical properties, for example transparency, mechanical strength, and heat resistance.

In addition, the polyimide may be easily cross-linked to provide a cross-linked polyimide, and the article prepared using the polyimide precursor composition may have excellently improved mechanical strength and heat resistance.

In one embodiment, in Chemical Formulae 1 to 3, $Ar^1$ may be the same or different in each repeating unit, and may be independently selected from the following chemical formulae, but is not limited thereto.

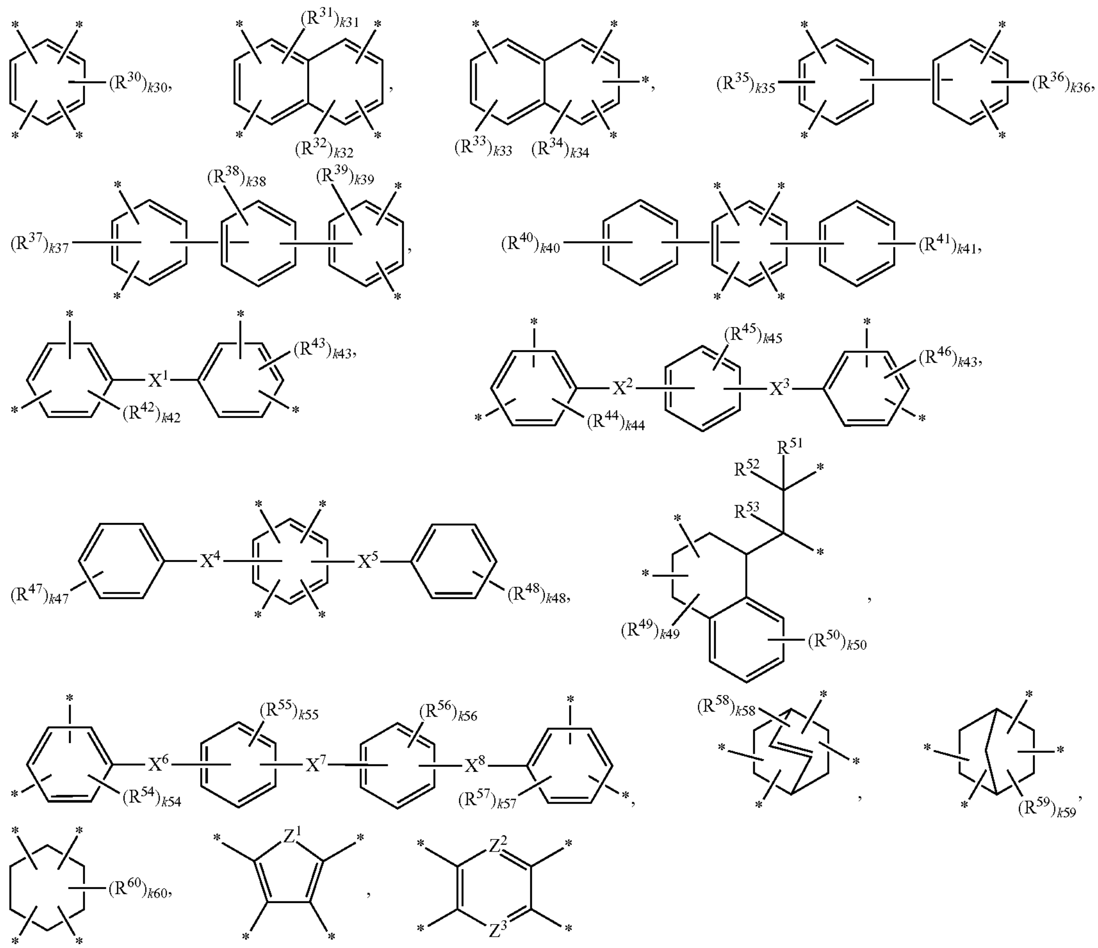

In the above chemical formulae, $X^1$ to $X^8$ are the same or different and are independently a single bond, —O—, —S—, —C(═O)—, —CH(OH)—, —S(═O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, or —C(═O)NH—, $Z^1$ is —O—, —S—, or —NR$^{300}$—, wherein $R^{300}$ is hydrogen or a C1 to C5 alkyl group, $Z^2$ and $Z^3$ are the same or different and are independently —N═ or —(R$^{301}$)═ wherein $R^{301}$ is hydrogen or a C1 to C5 alkyl group, provided that $Z^2$ and $Z^3$ are not simultaneously —C(R$^{301}$)═, $R^{30}$ to $R^{50}$ and $R^{54}$ to $R^{60}$ are the same or different and are independently a halogen, a substituted or unsubstituted C1 to C10 aliphatic organic group, or a substituted or unsubstituted C6 to C20 aromatic organic group, $R^{51}$ to $R^{53}$ are the same or different and are independently hydrogen, a halogen, a substituted or unsubstituted C1 to C10 aliphatic organic group, or a substituted or unsubstituted C6 to C20 aromatic organic group, k30, k31, and k32 are independently integers ranging from 0 to 2, k33, k35, k36, k37, k39, k42, k43, k44, k46, k54, and k57 are independently integers ranging from 0 to 3, k34 is an integer of 0 or 1, k38, k45, k50, k55, and k56 are independently integers ranging from 0 to 4, k40, k41, k47, k48, and k49 are independently integers ranging from 0 to 5, and k58, k59, and k60 are independently integers ranging from 0 to 8.

In another embodiment, in Chemical Formulae 1 to 3, $Ar^1$ may be the same or different in each repeating unit, and may be independently selected from the following chemical formulae, but is not limited thereto.

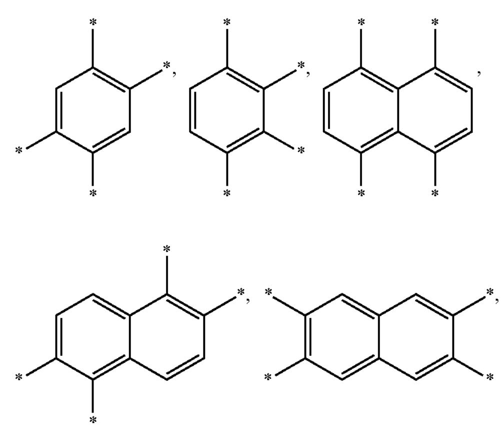

-continued
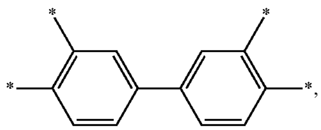
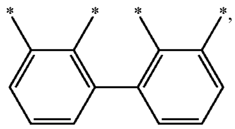
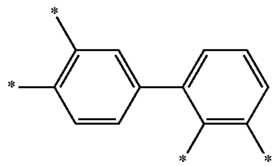
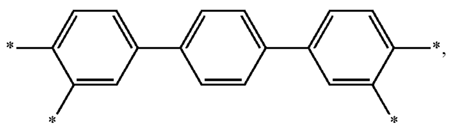
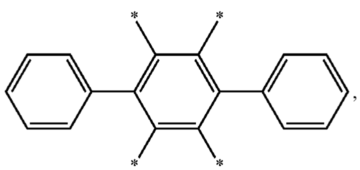
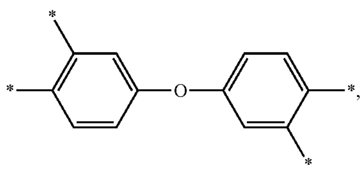
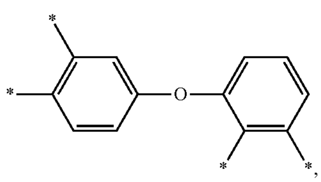
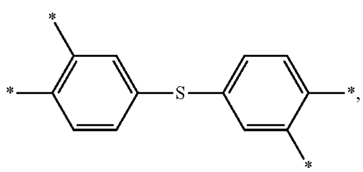
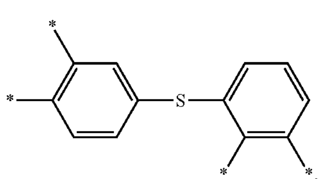
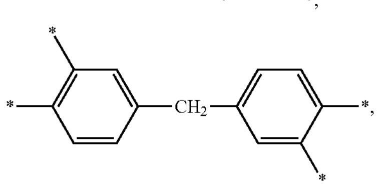
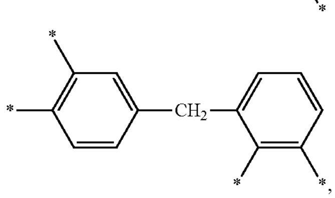
-continued
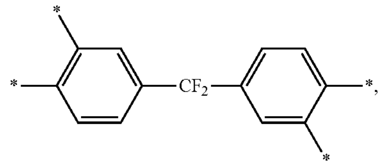
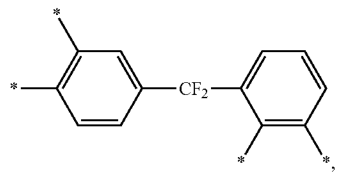
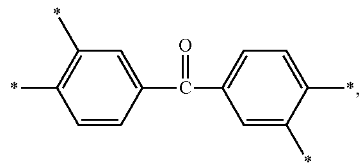
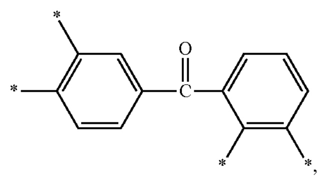
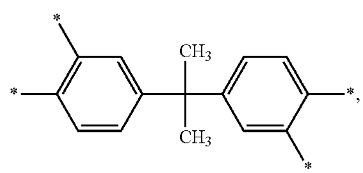
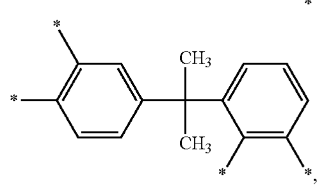
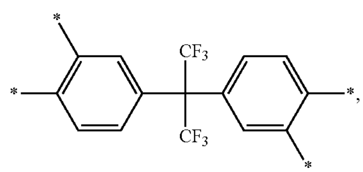
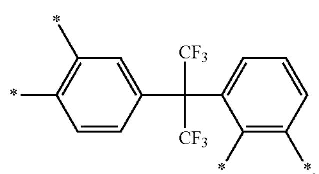
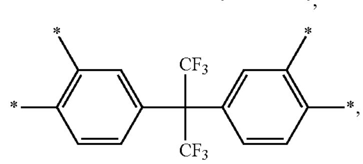
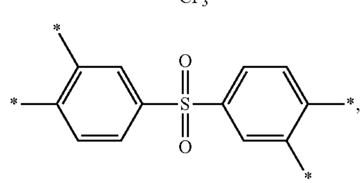

-continued

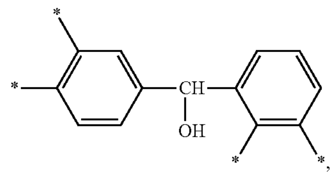
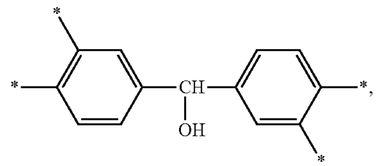
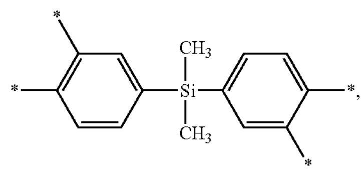
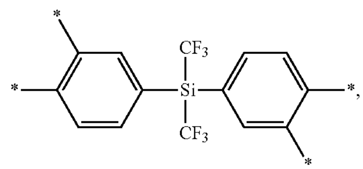
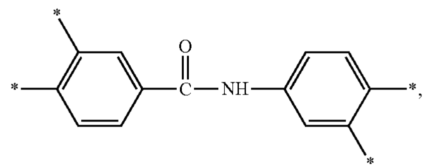
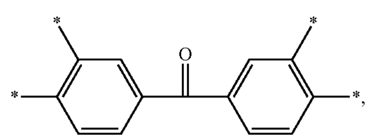
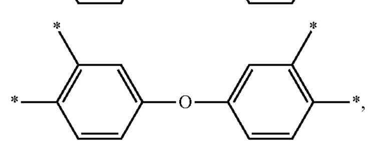
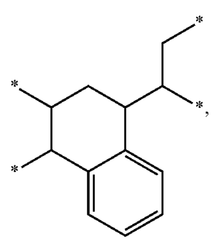
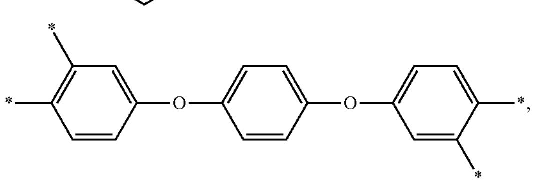
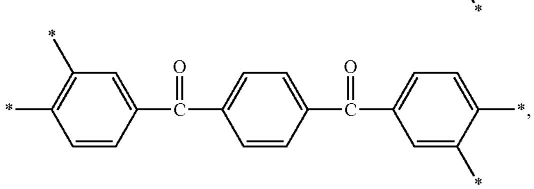

-continued

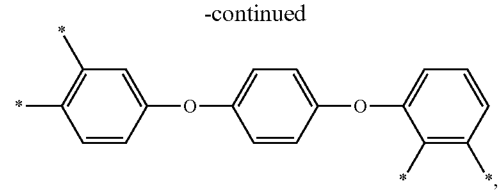
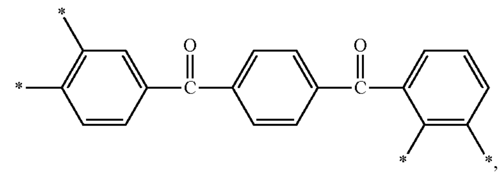
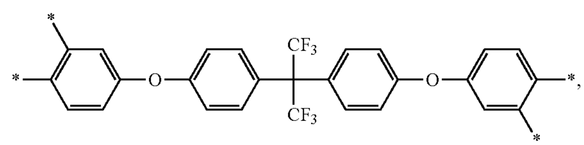
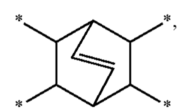
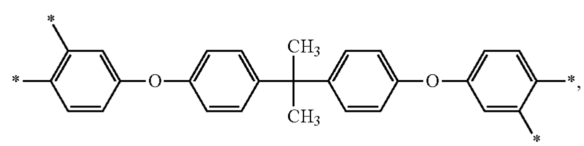
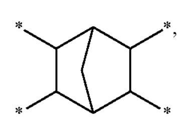
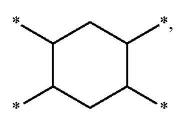
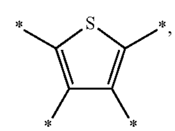
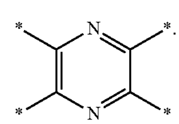

In one embodiment, in Chemical Formulae 1 to 3, $Ar^1$ may be a residual group of a dianhydride.

The dianhydride may be selected from 3,3',4,4'-biphenyltetracarboxylic dianhydride (BPDA), 2,2-bis-(3,4-dicarboxyphenyl)hexafluoropropane dianhydride (6FDA), benzophenone tetracarboxylic dianhydride (BTDA), 3,4-dicarboxyphenyl)sulfone dianhydride (DSDA), 4,4'-(4,4'-isopropylidenediphenoxy)bis(phthalic anhydride) (BPADA), 4,4'-oxydiphthalic anhydride (ODPA), 4-(2,5-dioxotetrahydrofuran-3-yl)-1,2,3,4-tetrahydronaphthalene-1,2-dicarboxylic anhydride (DTDA), and a combination thereof, but is not limited thereto.

In one embodiment, in Chemical Formulae 1 to 3, $Ar^2$ may be the same or different in each repeating unit, and may be independently selected from the following chemical formulae, but is not limited thereto.

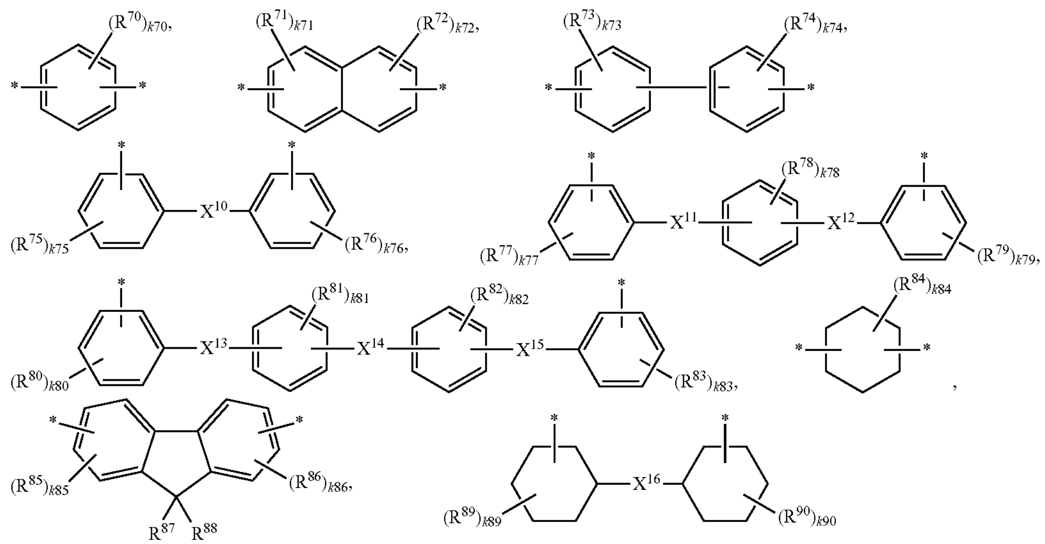

In the above chemical formula, $X^{10}$ to $X^{16}$ are the same or different and are independently a single bond, —O—, —S—, —C(═O)—, —CH(OH)—, —S(═O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, or —C(═O)NH—, $R^{70}$ to $R^{86}$ and $R^{89}$ to $R^{90}$ are the same or different and are independently a halogen, a substituted or unsubstituted C1 to C10 aliphatic organic group, or a substituted or unsubstituted C6 to C20 aromatic organic group, $R^{87}$ and $R^{88}$ are the same or different and are independently hydrogen, a halogen, a substituted or unsubstituted C1 to C10 aliphatic organic group, or a substituted or unsubstituted C6 to C20 aromatic organic group, k70, k73, k74, k75, k76, k77, k78, k79, k80, k81, k82, and k83 are independently integers ranging from 0 to 4, k71, k72, k85, and k86 are independently integers ranging from 0 to 3, and k84, k89, and k90 are independently integers ranging from 0 to 10.

In another embodiment, in Chemical Formulae 1 to 3, $Ar^2$ may be the same or different in each repeating unit, and may be independently selected from the following chemical formulae, but is not limited thereto.

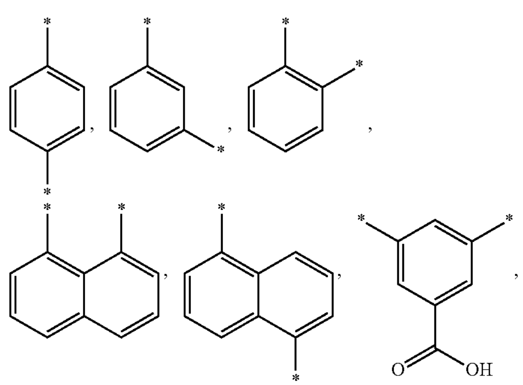

-continued

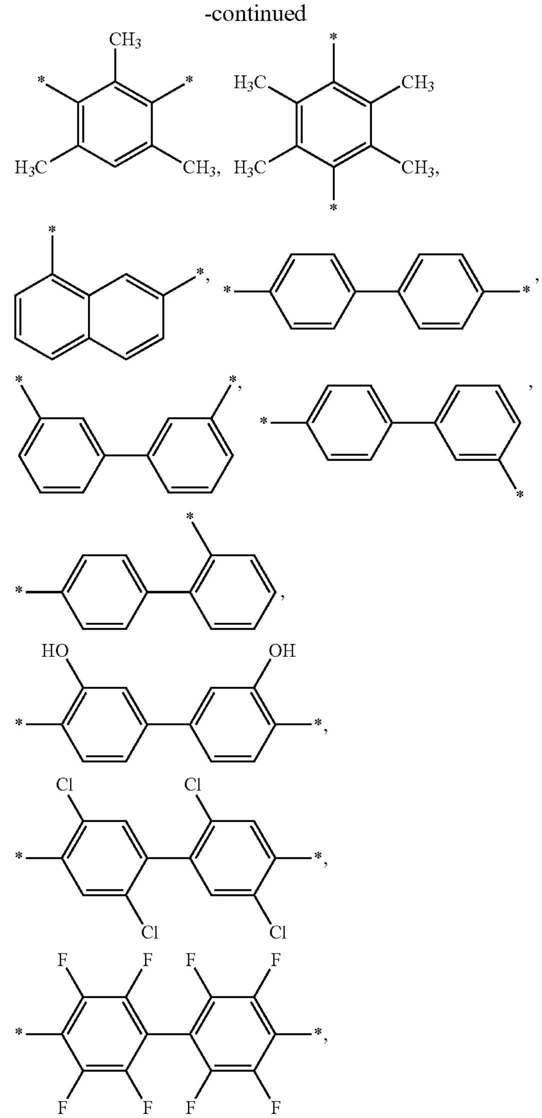

-continued
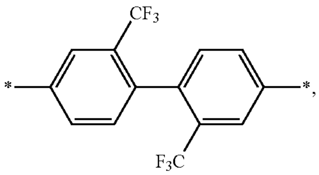
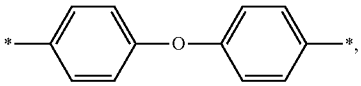
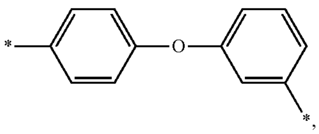
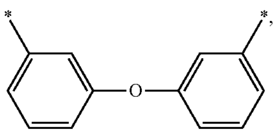
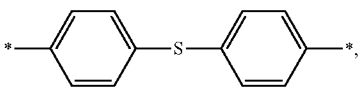
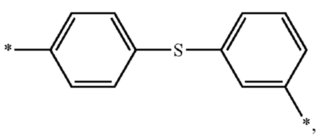
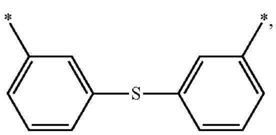
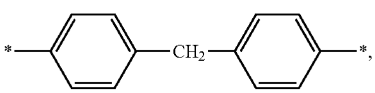
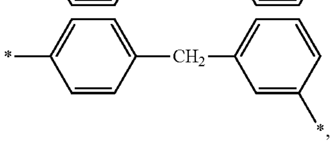
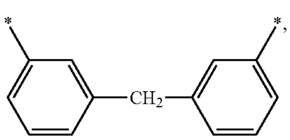
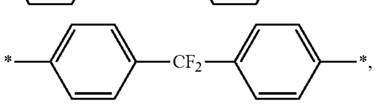
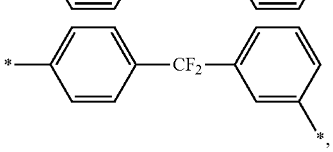
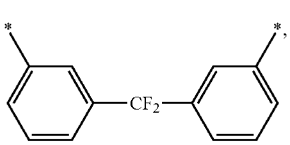
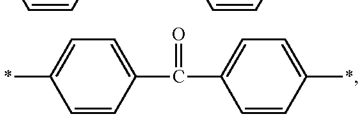
-continued
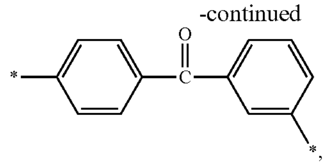
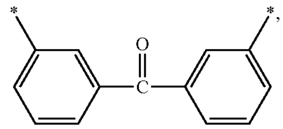
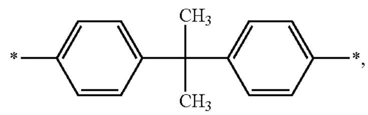
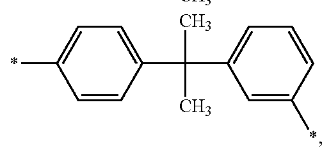
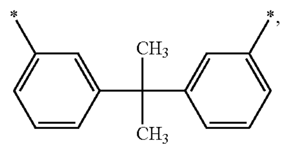
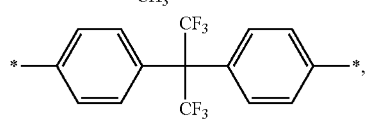
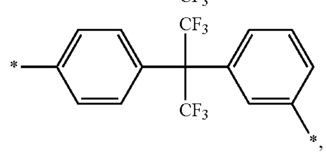
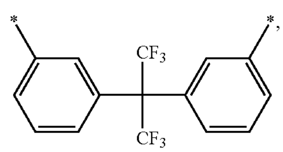
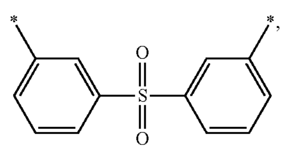
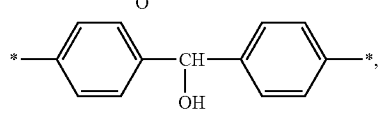
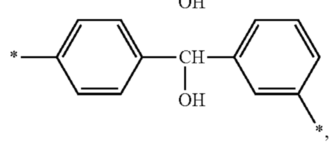
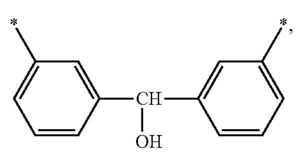
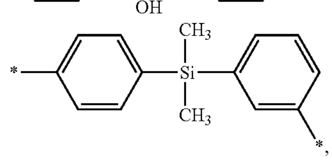

-continued

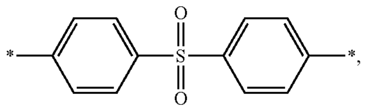

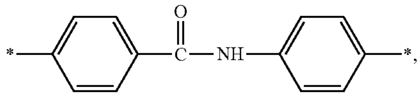

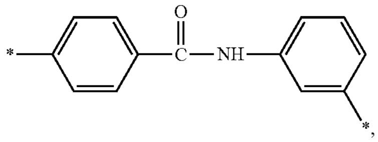

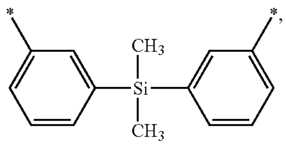

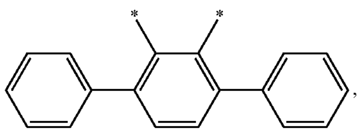

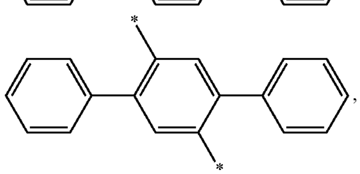

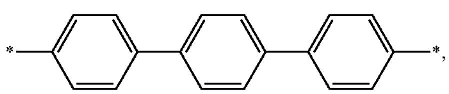

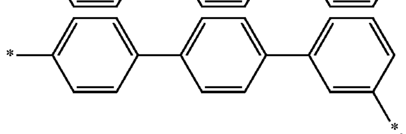

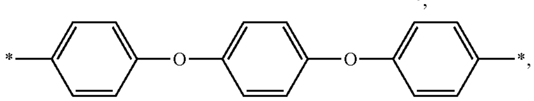

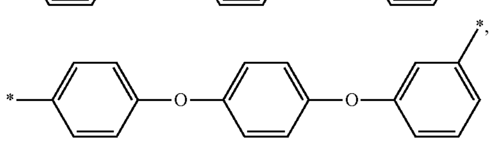

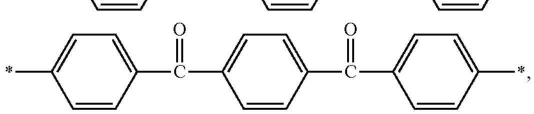

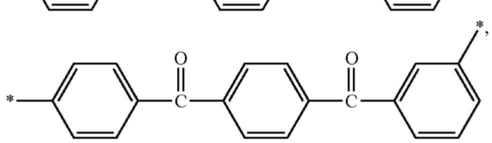

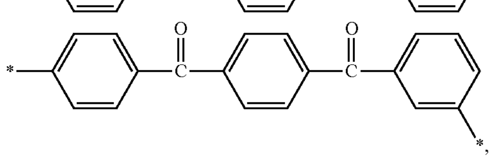

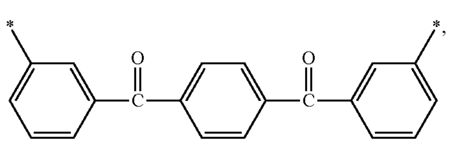

-continued

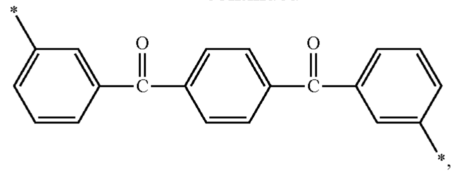

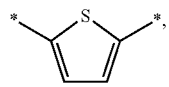

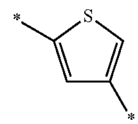

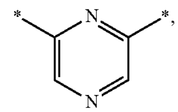

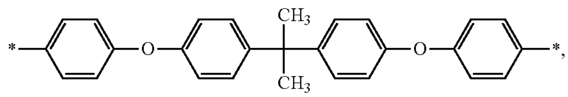

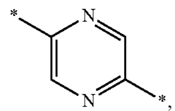

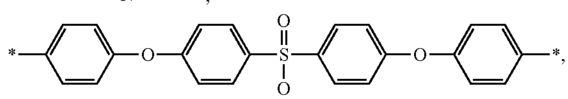

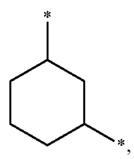

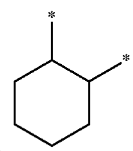

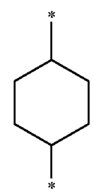

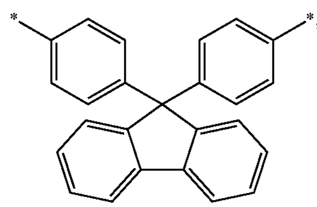

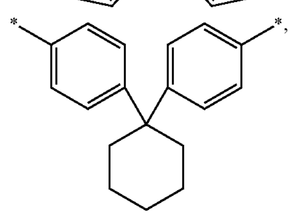

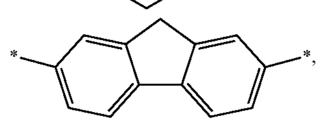

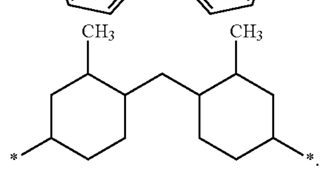

In one embodiment, in Chemical Formulae 1 to 3, $Ar^2$ may be a residual group of diamine.

The diamine may be selected from phenylenediamine, 2,2'-bis(trifluoromethyl)benzidine (TFDB), 4,4'-(9-fluorenylidene)dianiline (BAPF), 4,4'-diaminodiphenyl sulfone (DADPS), bis(4-(4-aminophenoxy)phenyl)sulfone (BAPS), 2,2',5,5'-tetrachlorobenzidine, 2,7-diaminofluorene, 2,7-diamino-9,9'diphenylfluorene, 1,1-bis(4-aminophenyl)cyclohexane, 4,4'-methylenebis-(2-methylcyclohexylamine), 4,4'-diaminooctafluorobiphenyl, 3,3'-dihydroxybenzidine, 1,3-cyclohexanediamine, and a combination thereof, but is not limited thereto.

In an embodiment, in the polyimide precursor composition, the cross-linking agent may include a compound selected from the following chemical formulae, but is not limited thereto.

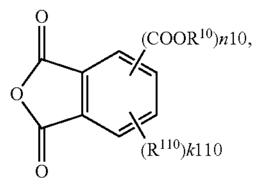

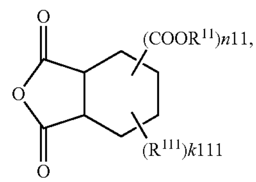

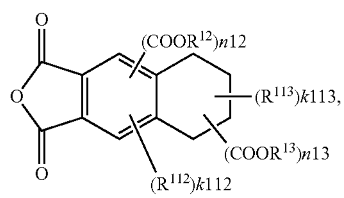

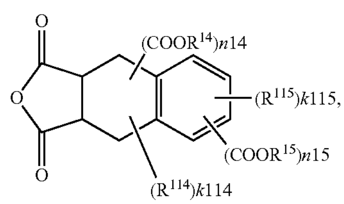

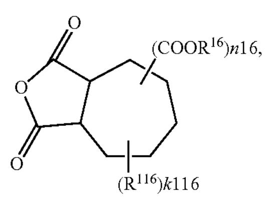

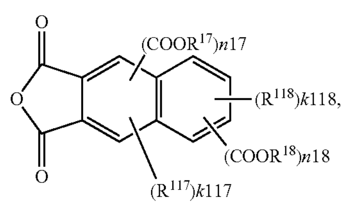

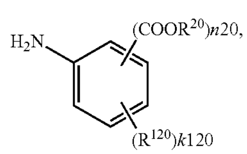

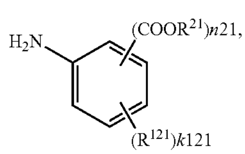

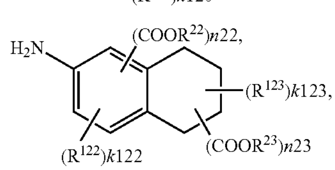

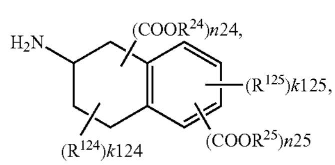

-continued

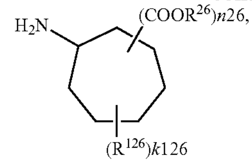

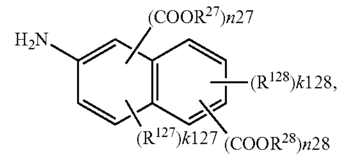

In the above chemical formulae, $R^{10}$ to $R^{18}$ and $R^{20}$ to $R^{28}$ are the same or different, and are independently hydrogen, or a C1 to C30 alkyl group, in an embodiment, hydrogen or a C1 to C20 alkyl group, in another embodiment hydrogen or a C1 to C10 alkyl group, and in yet another embodiment, hydrogen, a methyl group, or an ethyl group.

n10 is an integer ranging from 1 to 4, specifically 1 to 3, and more specifically 1 or 2.

n11 is an integer ranging from 1 to 10, specifically 1 to 3, and more specifically 1 or 2.

n12 is an integer ranging from 0 to 2 and n13 is an integer ranging from 0 to 8, provided that n12+n13 is an integer of greater than or equal to 1.

Specifically, the n12+n13 may be an integer of 1 to 3, and more specifically 1 or 2.

n14 is an integer ranging from 0 to 6 and n15 is an integer ranging from 0 to 4, provided that n14+n15 is an integer of greater than or equal to 1.

Specifically, the n14+n15 may be an integer of 1 to 3, and more specifically 1 or 2.

n16 is an integer ranging from 1 to 12, specifically 1 to 3, and more specifically 1 or 2.

n17 is an integer ranging from 0 to 2 and n18 is an integer ranging from 0 to 4, provided that n17+n18 is an integer of greater than or equal to 1.

Specifically, the n17+n18 may be an integer of 1 to 3, and more specifically 1 or 2.

n20 is an integer ranging from 1 to 5, specifically 1 to 3, and more specifically 1 or 2.

n21 is an integer ranging from 1 to 11, specifically 1 to 3, and more specifically 1 or 2.

n22 is an integer ranging from 0 to 3 and n23 is an integer ranging from 0 to 8, provided that n22+n23 is an integer of greater than or equal to 1, Specifically, the n22+n23 may be an integer of 1 to 3, and more specifically 1 or 2.

n24 is an integer ranging from 0 to 7 and n25 is an integer ranging from 0 to 4, provided that n24+n25 is an integer of greater than or equal to 1.

Specifically, the n24+n25 may be an integer of 1 to 3, and more specifically 1 or 2.

n26 is an integer ranging from 1 to 13, specifically 1 to 3, and specifically 1 or 2.

n27 is an integer ranging from 0 to 3 and n28 is an integer ranging from 0 to 4, provided that n27+n28 is an integer of greater than or equal to 1.

Specifically, the n27+n28 may be an integer of 1 to 3, and more specifically 1 or 2.

$R^{110}$ to $R^{118}$ and $R^{120}$ to $R^{128}$ are the same or different, and are independently a halogen, a substituted or unsubstituted C1 to C10 aliphatic organic group, or a substituted or unsubstituted C6 to C20 aromatic organic group.

k110 is an integer ranging from 0 to 3, k111 is an integer ranging from 0 to 9, k112 is an integer ranging from 0 to 2, k113 is an integer ranging from 0 to 8, k112+k113 is an integer ranging from 0 to 9, k114 is an integer ranging from 0 to 6, k115 is an integer ranging from 0 to 4, k114+k115 is an integer ranging from 0 to 9, k116 is an integer ranging from 0 to 11, k117 is an integer ranging from 0 to 2, k118 is an integer ranging from 0 to 4, k117+k118 is an integer ranging from 0 to 5, k120 is an integer ranging from 0 to 4, k121 is an integer ranging from 0 to 10, k122 is an integer ranging from 0 to 3, k123 is an integer ranging from 0 to 8, k122+k123 is an integer ranging from 0 to 10, k124 is an integer ranging from 0 to 7, k125 is an integer ranging from 0 to 4, k124+k125 is an integer ranging from 0 to 10, k126 is an integer ranging from 0 to 12, and k127 is an integer ranging from 0 to 3 and k128 is an integer ranging from 0 to 4, provided that k127+k128 is an integer ranging from 0 to 6.

In another embodiment, the cross-linking agent may include a compound selected from the following chemical formulae, but is not limited thereto.

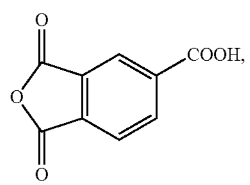
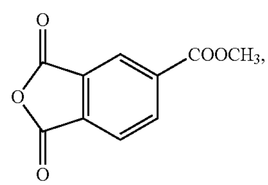
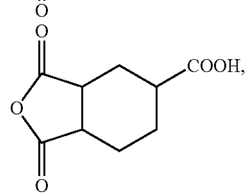
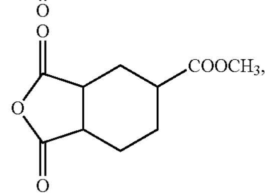
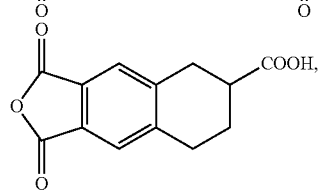
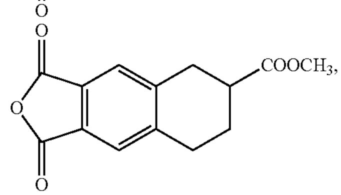
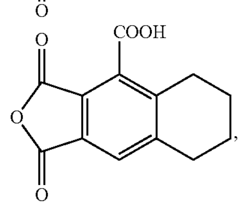
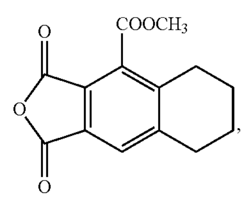

-continued

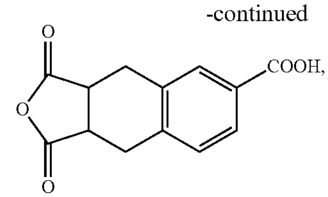
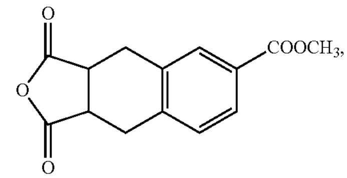
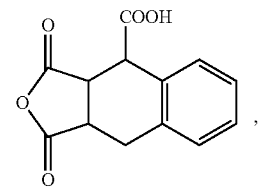
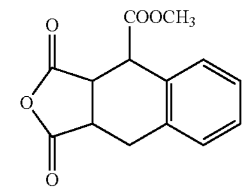
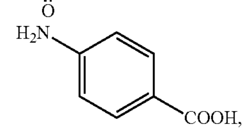
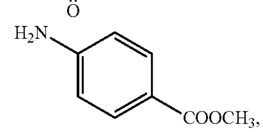
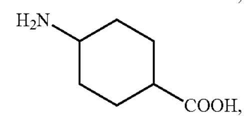
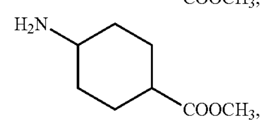
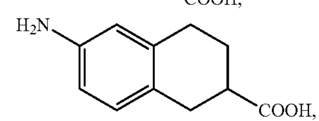
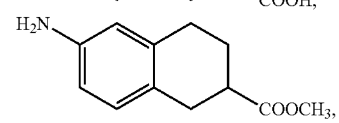
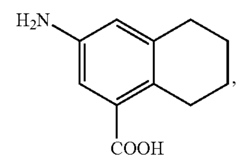
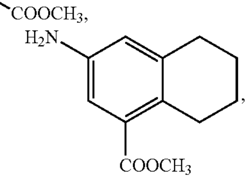
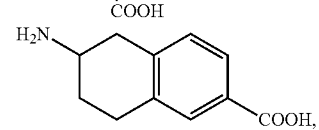
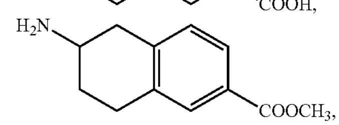
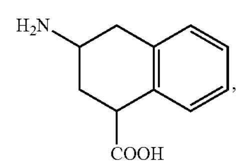
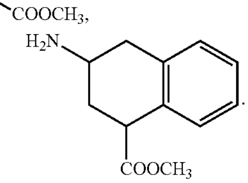

In an embodiment, the polyamic acid may include a compound selected from a compound represented by the following Chemical Formula 1-1, a compound represented by the following Chemical Formula 1-2, a compound represented by the following Chemical Formula 2-1, a compound represented by the following Chemical Formula 2-2, a compound represented by the following Chemical Formula 3-1, a compound represented by the following Chemical Formula 3-2, and a combination thereof, and the cross-linking agent may include a compound selected from compounds represented by the following Chemical Formulae 4-1 to 4-6, compounds represented by the following Chemical Formulae 5-1 to 5-6, and a combination thereof, without limitation.

Chemical Formula 1-1

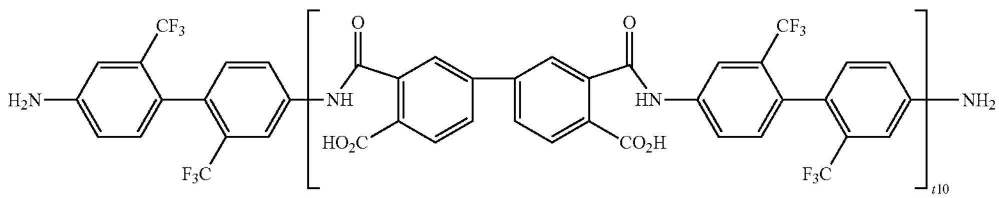

Chemical Formula 1-2

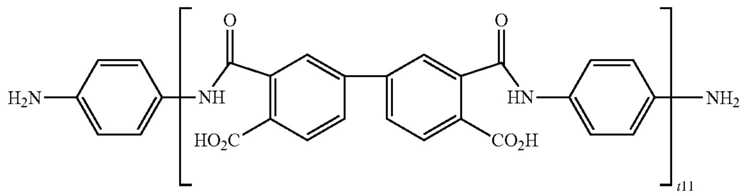

Chemical Formula 2-1

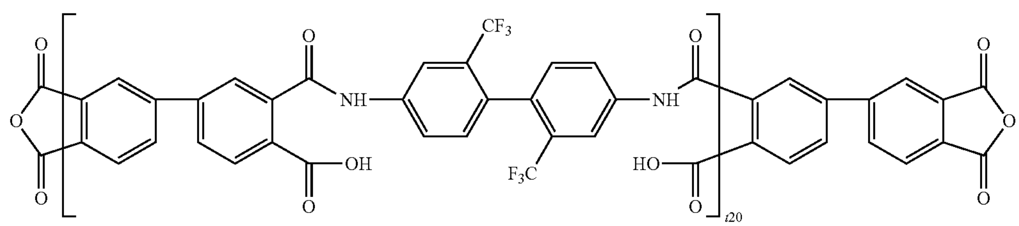

Chemical Formula 2-2

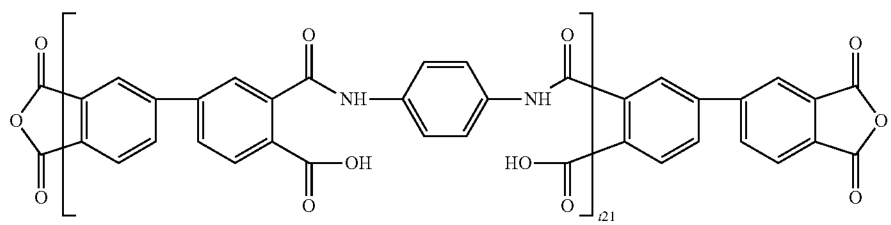

Chemical Formula 3-1

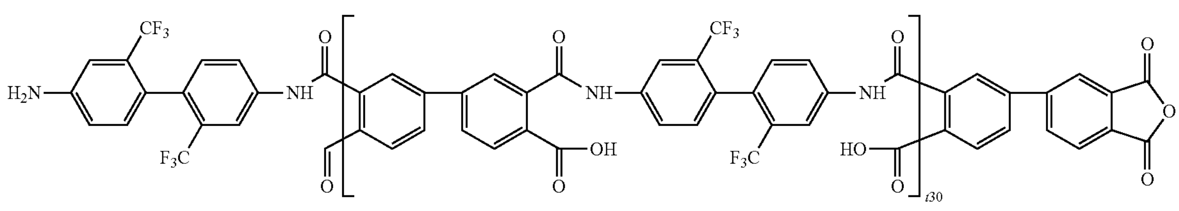

Chemical Formula 3-2

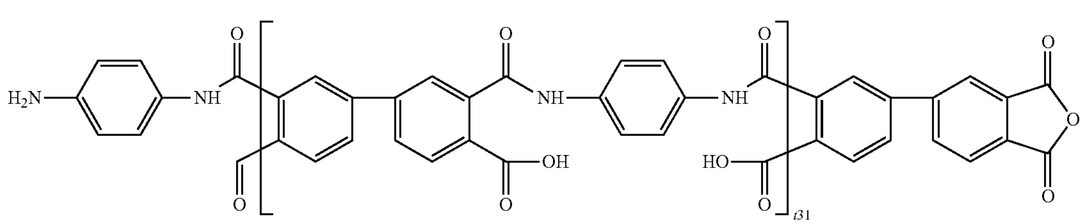

In Chemical Formulae 1-1, 1-2, 2-1, 2-2, 3-1, and 3-2, t10, t11, t20, t21, t30, and t31 are independently integers of greater than or equal to 2.

Chemical Formula 4-1 and Chemical Formula 4-2

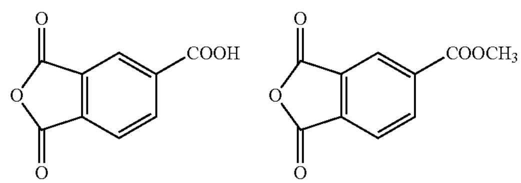

Chemical Formula 4-3 and Chemical Formula 4-4

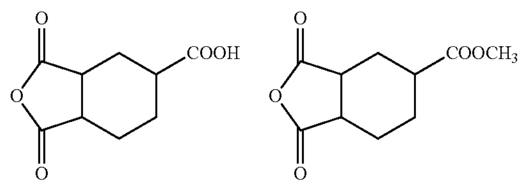

Chemical Formula 4-5 and Chemical Formula 4-6

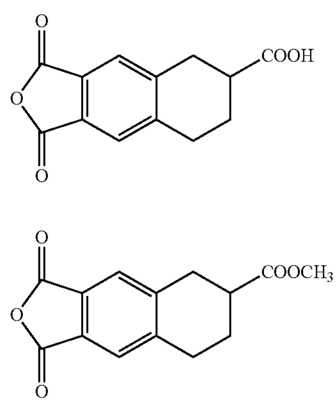

Chemical Formula 5-1 and Chemical Formula 5-2

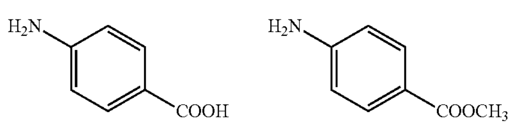

Chemical Formula 5-3 and Chemical Formula 5-4

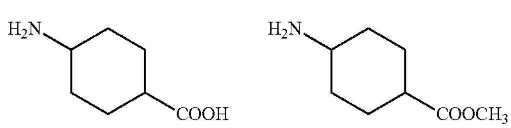

Chemical Formula 5-5 and Chemical Formula 5-6

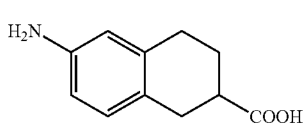

-continued

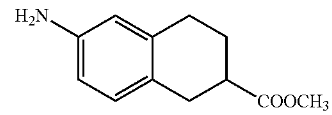

In the polyimide precursor composition, the polyamic acid may have a weight average molecular weight (Mw) of about 1000 g/mol to about 100,000 g/mol.

When the polyamic acid has a weight average molecular weight (Mw) within the above range, spray coating, spin coating, and slot die coating for forming a thin film may be applicable.

In an embodiment, the polyamic acid may have a weight average molecular weight (Mw) of about 10,000 g/mol to about 50,000 g/mol.

In the polyimide precursor composition, the polyamic acid may have a number average molecular weight (Mn) of about 1000 g/mol to about 100,000 g/mol.

When the polyamic acid has a number average molecular weight (Mn) within the above range, a resultant thin film may have basic properties such as mechanical strength.

In an embodiment, the polyamic acid may have a number average molecular weight (Mn) of about 5000 g/mol to about 30,000 g/mol.

In the polyimide precursor composition, the polyamic acid may have an intrinsic viscosity of about 0.1 dL/g to about 2.0 dL/g.

When the polyamic acid has an intrinsic viscosity within the above range, a resultant thin film may have basic properties such as mechanical strength.

In an embodiment, the polyamic acid may have an intrinsic viscosity of about 0.5 dL/g to about 1.5 dL/g.

In the polyimide precursor composition, the cross-linking agent may be present in an amount of greater than about 0 mol % and less than or equal to about 5 mol % based on the sum, 100 mol % of the dianhydride and the diamine used for preparing the polyamic acid the cross-linking agent.

Within the above range, a resultant thin film may have the same basic properties such as mechanical strength as a film using a high molecular weight polymer.

The polyimide precursor composition may have a viscosity of about 10 cps to about 30,000 cps.

When the polyimide precursor composition has a viscosity within the above range, a resultant thin film may have the same basic properties such as mechanical strength as a film using a high molecular weight polymer.

Specifically, the polyimide precursor composition may have a viscosity of about 50 cps to about 20,000 cps.

For example, the polyimide precursor composition may include a polyamic acid including a compound represented by the above Chemical Formula 1, and a cross-linking agent including a compound represented by the above Chemical Formula 4.

Herein, the polyimide precursor composition may satisfy the following Equation 1.

$$A_1C_1=B_1 \quad \text{Equation 1}$$

In Equation 1, $A_1$ is a mole number of the dianhydride used for preparing the compound represented by the above Chemical Formula 1, $B_1$ is a mole number of the diamine used for preparing the compound represented by the above Chemical Formula 1, $C_1$ is a mole number of the cross-linking agent, and $C_1$ is greater than about 0 mol % and less than or equal to about 5 mol % based on the total amount, 100 mol % of $A_1+B_1+C_1$.

In this way, when diamine is used in a greater amount than dianhydride during preparation of polyamic acid, polyamic acid having an amine group at both terminal ends such as a compound represented by the above Chemical Formula 1 may be provided.

One part of the terminal amine group reacts with an anhydride group of the cross-linking agent including the compound represented by the above Chemical Formula 4, and thereby a carboxyl group or an ester group derived from the cross-linking agent may be positioned at a terminal end of the polyamic acid.

Subsequently, the other part of the terminal amine group reacts with a carboxyl group or an ester group at the terminal end of the polyamic acid to form an amide bond, and thereby the polyamic acids may be cross-linked to each other.

Thereby, the polyimide prepared by using the polyimide precursor composition may have an increased weight average molecular weight and number average molecular weight, and an article including the polyimide may have improved transparency, mechanical strength, and heat resistance.

Therefore, the polyimide precursor composition has good workability, and an article prepared using the same may have improved transparency, mechanical strength, and heat resistance.

Accordingly, the polyimide precursor composition may be used to produce various molded products requiring transparency.

For example, the polyimide precursor composition may be applied to a substrate for a display, specifically, a substrate for a flexible display, a touch panel, a protective film for an optical disk, and the like.

Hereinafter, a method of preparing the polyimide precursor composition is described.

For example, the polyimide precursor composition may be prepared by preparing polyamic acid, and adding a cross-linking agent to the polyamic acid.

According to the low-temperature solution polymerization method, dianhydride reacts with diamine in an aprotic polar solvent to prepare polyamic acid.

Hereinafter, when otherwise description is not provided, the dianhydride and diamine are the same as described above.

Herein, according to a desirable composition of the polyamic acid, kinds and amounts of the dianhydride and diamine may be appropriately adopted.

The aprotic polar solvent may include a sulfoxide-based solvent such as dimethyl sulfoxide and diethyl sulfoxide, a formamide-based solvent such as N,N-dimethylformamide and N,N-diethylformamide, an acetamide-based solvent such as N,N-dimethylacetamide and N,N-diethylacetamide, a pyrrolidone-based solvent such as N-methyl-2-pyrrolidone and N-vinyl-2-pyrrolidone, a phenol-based solvent such as phenol, o-, m-, or p-cresol, xylenol, halogenated phenol, and catechol, hexamethylphosphoramide, γ-butyrolactone, or a combination thereof.

However, this disclosure is not limited to them, and an aromatic hydrocarbon such as xylene and toluene may be used.

Also, an alkali metal salt or an alkaline earth metal salt may be further added to the solvent in an amount of about 50 wt % or less based on the total amount of the solvent to promote solubility.

Subsequently, the cross-linking agent is added to the prepared polyamic acid to prepare the polyimide precursor composition.

Hereinafter, when otherwise description is not provided, the polyamic acid and cross-linking agent are the same as described above.

According to another embodiment, polyamic acid may include a compound selected from a compound represented by the following Chemical Formula 1, a compound represented by the following Chemical Formula 6, a compound represented by the following Chemical Formula 7, and a combination thereof.

Chemical Formula 1

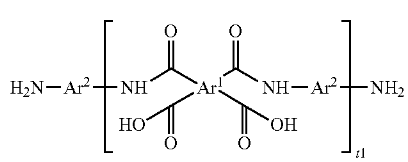

Chemical Formula 6

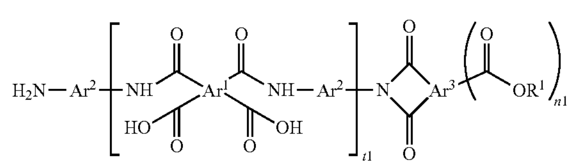

Chemical Formula 7

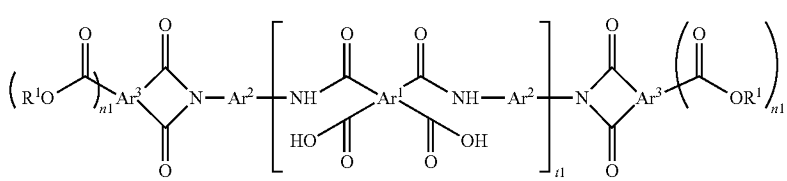

However, without limitation, during preparation of polyamic acid, the cross-linking agent may be added along with dianhydride and diamine to prepare polyamic acid.

The polyamic acid of the polyimide precursor composition may be prepared through a method such as a low-temperature solution polymerization method, an interfacial polymerization method, a melt polymerization method, and a solid-phase polymerization method, without limitation.

Among them, a low-temperature solution polymerization method is taken as an example, and a method for preparing the polyamic acid is described.

In Chemical Formulae 1, 6, and 7, $Ar^1$, $Ar^2$, and t1 are the same as described in Chemical Formulae 1 to 3, and $Ar^3$, R', and n1 are the same as described in Chemical Formula 4.

The polyamic acid may include a carboxyl group or an ester group derived from the cross-linking agent by reacting with a terminal amine group of polyamic acid.

According to another embodiment, a polyimide precursor includes a repeating unit represented by the following Chemical Formula 8.

Chemical Formula 8

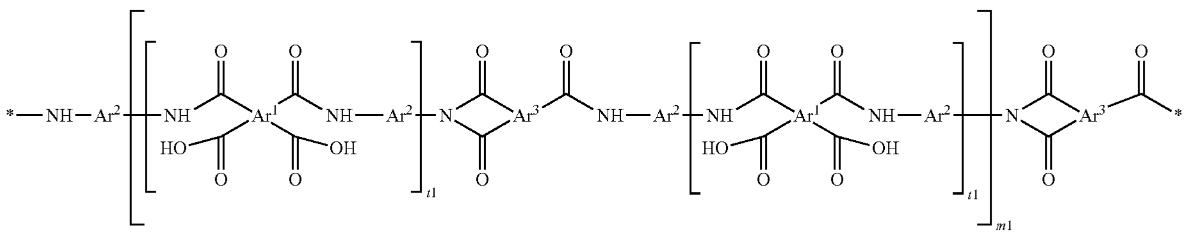

In Chemical Formula 8, $Ar^1$, $Ar^2$, and t1 are the same as described in Chemical Formulae 1 to 3, $Ar^3$ is the same as described in Chemical Formulae 4, and m1 is an integer of greater than or equal to 1, specifically 3 to 1000, and more specifically 10 to 500.

The polyimide precursor may include polyamic acids cross-linked through an amide group by using a cross-linking agent.

According to another embodiment, an article including the cross-linked polyimide prepared from a composition selected from the polyimide precursor composition, the polyamic acid, and the polyimide precursor is prepared.

-continued

Chemical Formula 11

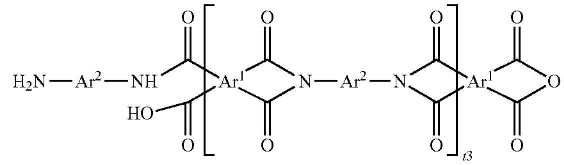

In Chemical Formulae 9 to 11, $Ar^1$, $Ar^2$, t1, t2, and t3 are the same as described in Chemical Formulae 1 to 3.

In an embodiment, the cross-linked polyimide may include a repeating unit represented by the following Chemical Formula 12, but is not limited thereto.

Chemical Formula 12

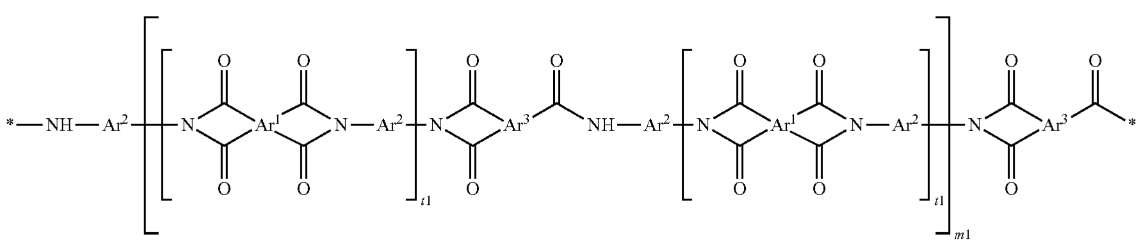

The cross-linked polyimide may be a polyimide selected from compounds represented by the following Chemical Formulae 9 to 11, and a combination thereof, that is cross-linked through an amide bond by using a cross-linking agent selected from the compound represented by the above Chemical Formula 4, the compound represented by the above Chemical Formula 5, and a combination thereof.

Chemical Formula 9

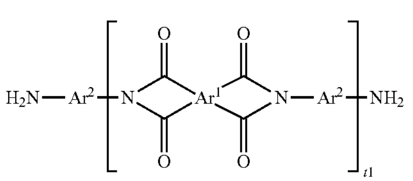

Chemical Formula 10

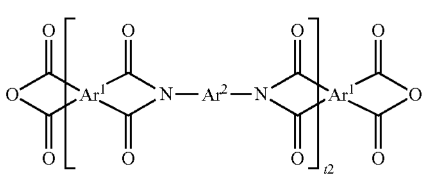

In Chemical Formula 12, $Ar^1$, $Ar^2$, and t1 are the same as described in Chemical Formulae 1 to 3, $Ar^3$ is the same as described in Chemical Formula 4, and m1 is an integer of greater than or equal to 1, specifically 3 to 1000, and more specifically 10 to 500.

The cross-linked polyimide may be prepared by imidizing polyamic acid using various methods such as thermal imidization, chemical imidization, and the like.

The article may have excellent transparency, mechanical strength, and heat resistance due to the cross-linked polyimide.

The cross-linked polyimide may have a weight average molecular weight (Mw) of about 1000 g/mol to about 100,000 g/mol.

When the cross-linked polyimide has a weight average molecular weight (Mw) within the above range, a resultant thin film may have the same basic properties such as mechanical strength as a film using a high molecular weight polymer.

Specifically, the cross-linked polyimide may have a weight average molecular weight of about 5000 g/mol to about 50,000 g/mol.

The cross-linked polyimide may have a weight average molecular weight (Mw) of about 1000 g/mol to about 100,000 g/mol.

When the cross-linked polyimide has a number average molecular weight (Mn) within the above range, a resultant thin film may have the same basic properties such as mechanical strength as a film using a high molecular weight polymer.

Specifically, the cross-linked polyimide may have a number average molecular weight (Mn) of about 5000 g/mol to about 30,000 g/mol.

The cross-linked polyimide may have a polydispersity index (PDI) of about 1 to about 20.

When the cross-linked polyimide has a polydispersity index (PDI) within the above range, a film may be prepared.

Specifically, the cross-linked polyimide may have a polydispersity index (PDI) of about 2 to about 10.

The cross-linked polyimide may have a viscosity of about 10 cps to about 30,000 cps.

When the cross-linked polyimide has a viscosity within the above range, spray coating, spin coating, and slot die coating for forming a thin film may be applicable.

Specifically, the cross-linked polyimide may have a viscosity of about 50 cps to about 20,000 cps.

The cross-linked polyimide may have an intrinsic viscosity of about 0.1 dL/g to about 2.0 dL/g.

When the cross-linked polyimide has an intrinsic viscosity within the above range, it may be easily processed and a resultant thin film may have the same basic properties such as mechanical strength as a film using a high molecular weight polymer.

Specifically, the cross-linked polyimide may have an intrinsic viscosity of about 0.5 dL/g to about 1.5 dL/g.

The article may be a film, a fiber, a coating material, or an adhesive, but is not limited thereto.

For example, the article may be formed of the polyimide precursor composition through a dry-wet method, a dry method, or a wet method, such as slot die coating, spin coating, and the like, without limitation.

When a film among the articles is manufactured through the dry-wet method, the film is formed by extruding the polyimide precursor composition from a spinner on a supporter such as drum or an endless belt, and drying it and evaporating the solvent out of the film until the film is self-maintaining.

The drying may be performed at about 25° C. to about 220° C. for about 1 hour or less.

When the surface of the drum and/or the endless belt used for the drying process becomes flat, a film with a flat surface is obtained.

The film obtained after the drying process is delaminated from the supporter, and inputted to a wet process for demineralization and/or desolventization, and the manufacturing of the film is completed as it goes through elongating, drying, and/or heat treatment.

However, without limitation, the elongating process may be omitted.

The elongating is done to an elongation ratio, which may range from about 0.8 to about 8 in terms of surface ratio. According to an embodiment, it may range from about 1.3 to about 8. Herein, the surface ratio is defined as a value obtained by dividing the area of a film after elongating by an area of the film before elongating.

Meanwhile, the elongating may be performed not only in a surface direction but also in a thickness direction.

The heat treatment may be performed by increasing a temperature at about 0.5° C./minute to about 500° C./second, and at a temperature of about 200° C. to about 500° C., and specifically about 250° C. to about 400° C. for several seconds to hours.

Through the heat treatment, polyamic acid of the polyimide precursor composition is converted to polyimide, and the amine group or anhydride group at the terminal end of the polyimide forms an amide bond with the cross-linking agent and cross-links to produce the cross-linked polyimide.

Also, the film after elongating and heat treatment may be cooled slowly, particularly at a speed of about 50° C./second or lower.

The film may be formed as a single layer or as multiple layers The article, for example a film, may have a thickness of about 0.01 μm to about 1000 μm, specifically about 0.1 μm to about 200 μm, and more specifically about 0.1 μm to about 50 μm. However, the thickness is not limited thereto and the thickness may be adjusted appropriately according to the usage.

The article may have an average light transmittance of greater than or equal to about 80% in a wavelength range of about 380 nm to about 780 nm.

When the article has an average light transmittance within the above range, the article may have excellent color reproducibility.

Specifically, the article may have an average light transmittance of about 80% to about 95% in a wavelength range of about 380 nm to about 800 nm.

The article may have light transmittance of greater than or equal to about 45% at a wavelength of about 400 nm.

When the article has light transmittance of greater than or equal to about 45% at a wavelength of about 400 nm, the article may have excellent color reproducibility.

Specifically, the article may have light transmittance of about 50% to about 90% at a wavelength of about 400 nm.

The article has a ness index (YI) of less than or equal to 5.

When the yellowness index (YI) of the article is within the range, the article may be transparent and colorless.

Specifically, the article may have a yellowness index (YI) of about 0.5 to about 5, more specifically about 0.5 to about 4, and even more specifically about 0.5 to about 3.

The article may have a haze of less than or equal to about 10%.

When the haze of the article is within the range, the article may be transparent enough to have excellent clarity.

The article have a coefficient of thermal expansion (CTE) of less than or equal to about 20 ppm/° C.

When the coefficient of thermal expansion of the article is within the range, the article may have excellent heat resistance.

The article may have a glass transition temperature ($T_g$) of about 150° C. to about 450° C.

When the article has a glass transition temperature ($T_g$) within the above range, the article may withstand process temperatures and thermal distortion during device processes.

Specifically, the article may have a glass transition temperature ($T_g$) of about 200° C. to about 400° C.

The article may have a weight loss ratio of less than or equal to about 1% at about 400° C.

The article may not be decomposed at a high temperature, outgas may be suppressed, and the article may have excellent thermal stability.

Specifically, the article may have a weight loss ratio of less than or equal to about 0.2% at about 400° C.

The article may be manufactured from a composition selected from a polyimide precursor composition, polyamic acid, and a polyimide precursor wherein all of these compositions have excellent workability.

Since the article includes the cross-linked polyimide prepared from a composition selected from the polyimide precursor composition, the polyamic acid, and the polyimide precursor, which has transparency, heat resistance, mechanical strength, and flexibility, the article may have excellent transparency, heat resistance, mechanical strength, and flexibility.

Therefore, the article may be used in diverse areas, for example, the article can be used as a substrate for a device, a substrate for a display device, an optical film, an integrated circuit (IC) package, an adhesive film, a multi-layer flexible printed circuit (FRC), a tape, a touch panel, and a protective film for an optical disk.

Another embodiment provides a display device including the article.

Particularly, the display device may include a liquid crystal display (LCD), an organic light emitting diode (OLED), an active matrix organic light emitting diode (AMOLED), and the like, but is not limited thereto.

Among the display devices, an exemplary liquid crystal display (LCD) is described by referring to FIG. 1.

FIG. 1 is a cross-sectional view of a liquid crystal display (LCD) in accordance with an embodiment.

Referring to FIG. 1, the liquid crystal display (LCD) includes a thin film transistor array panel 100, a common electrode panel 200 facing the thin film transistor array panel 100, and a liquid crystal layer 3 interposed between the two panels 100 and 200.

First, the thin film transistor array panel 100 will be described.

A gate electrode 124, a gate insulating layer 140, a semiconductor 154, a plurality of ohmic contacts 163 and 165, a source electrode 173 and a drain electrode 175 are sequentially disposed on a substrate 110.

The source electrode 173 and the drain electrode 175 are isolated from each other and face each other with the gate electrode 124 between them.

One gate electrode 124, one source electrode 173, and one drain electrode 175 constitute one thin film transistor (TFT) together with the semiconductor 154, and a channel of the thin film transistor is formed in the semiconductor 154 between the source electrode 173 and the drain electrode 175.

A protective layer 180 is disposed on the gate insulating layer 140, the source electrode 173, and the drain electrode 175, and a contact hole 185 that exposes the drain electrode 175 is formed in the protective layer 180.

A pixel electrode 191 formed of a transparent conductive material such as ITO or IZO is disposed on the protective layer 180.

The pixel electrode 191 is connected to the drain electrode 175 through the contact hole 185.

The common electrode panel 200 will now be described.

In the common electrode panel 200, a light blocking member 220 referred to as a black matrix is disposed on a substrate 210, a color filter 230 is disposed on the substrate 210 and the light blocking member 220, and a common electrode 270 is formed on the color filter 230.

Herein, the substrates 110 and 210 may be articles manufactured using one selected from the polyimide precursor composition, the polyamic acid, and the polyimide precursor.

Figure 2:
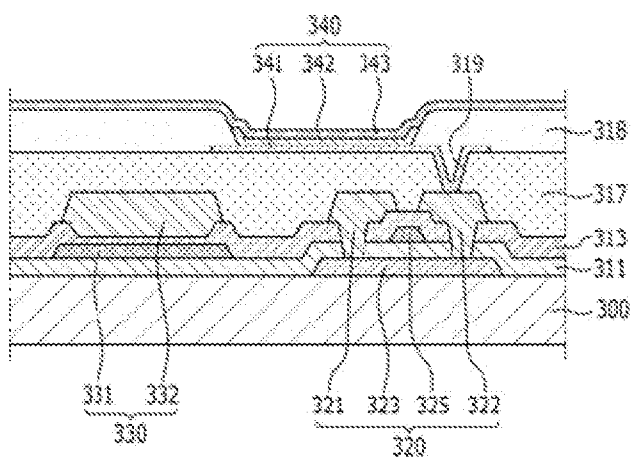
FIG. 2 is a cross-sectional view of an organic light emitting diode (OLED) according to an embodiment.

Meanwhile, among the display devices, an organic light emitting diode (OLED) is described referring to FIG. 2.

FIG. 2 is a cross-sectional view of an organic light emitting diode (OLED) in accordance with an embodiment of this disclosure.

Referring to FIG. 2, a thin film transistor 320, a capacitor 330, and an organic light emitting element 340 are formed on a substrate 300.

The thin film transistor 320 includes a source electrode 321, a semiconductor layer 323, a gate electrode 325, and a drain electrode 322, and the capacitor 330 includes a first capacitor 331 and a second capacitor 332. The organic light emitting element 340 includes a pixel electrode 341, an intermediate layer 342, and an opposed electrode 343.

According to an embodiment of this disclosure, the semiconductor layer 323, a gate insulating layer 311, the first capacitor 331, the gate electrode 325, an interlayer insulating layer 313, the second capacitor 332, the source electrode 321, and the drain electrode 322 are formed on the substrate 300.

The source electrode 321 and the drain electrode 322 are isolated from each other, and they face each other with the gate electrode 325 between them.

A planarization layer 317 is disposed on the interlayer insulating layer 313, the second capacitor 332, the source electrode 321, and the drain electrode 322, and the planarization layer 317 includes a contact hole 319 that exposes the drain electrode 322.

The pixel electrode 341 formed of a transparent conductive material such as ITO or IZO is disposed on the planarization layer 317.

The pixel electrode 341 is connected to the drain electrode 322 through the contact hole 319.

The intermediate layer 342 and the opposed electrode 343 are sequentially disposed on the pixel electrode 341.

A pixel defining layer 318 is formed in a portion where the pixel electrode 341, the intermediate layer 342, and the opposed electrode 343 are not formed on the planarization layer 317.

Herein, the substrate 300 may be formed of the article manufactured using one selected from the polyimide precursor composition, the polyamic acid, and the polyimide precursor.

EXAMPLES

Hereafter, the technology of this disclosure is described in detail with reference to examples and comparative examples. The following examples and comparative examples are not restrictive but are illustrative.

Synthesis Example 1

Preparation of Polyimide Precursor Composition 0.98 mol of 3,3',4,4'-biphenyltetracarboxylic dianhydride (BPDA), 0.90 mol of 2,2'-bis(trifluoromethyl)benzidine (TFDB), and 0.10 mol of phenylenediamine are reacted in N-methyl-2-pyrrolidone (NMP) in a 500 mL round-bottomed flask at 20° C. for 48 hours, obtaining polyamic acid having a solid content of 18 wt %.

The obtained polyamic acid has an intrinsic viscosity of 0.81 dL/g.

Synthesis Example 2

Preparation of Polyimide Precursor Composition 0.98 mol of 3,3',4,4'-biphenyltetracarboxylic dianhydride (BPDA), 0.95 mol of 2,2'-bis(trifluoromethyl)benzidine (TFDB), and 0.05 mol of phenylenediamine are reacted in N-methyl-2-pyrrolidone (NMP) at 20° C. for 48 hours in a 500 mL round-bottomed flask, obtaining polyamic acid having a solid content of 18 wt %.

The obtained polyamic acid has an intrinsic viscosity of 0.81 dL/g.

Next, 0.02 mol of a compound represented by the following Chemical Formula 4-1 is added to the polyamic acid, preparing a polyimide precursor composition.

Chemical Formula 4-1

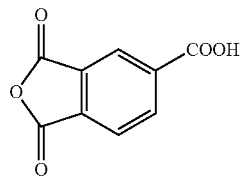

Synthesis Example 3

Preparation of Polyimide Precursor Composition 0.98 mol of 3,3',4,4'-biphenyltetracarboxyllc dianhydride (BPDA), 0.90 mol of 2,2'-bis(trifluoromethyl)benzidine (TFDB), and 0.10 mol of phenylenediamine are reacted in N-methyl-2-pyrrolidone (NMP) in a 500 mL round-bottomed flask at 20° C. for 48 hours, obtaining polyamic acid having a solid content of 18 wt %.

The obtained polyamic acid has an intrinsic viscosity of 0.72 dL/g.

Then, 0.02 mol of a compound represented by the above Chemical Formula 4-1 is added to the polyamic acid, preparing a polyimide precursor composition.

Synthesis Example 4

Preparation of Polyimide Precursor Composition 0.96 mol of 3,3',4,4'-biphenyltetracarboxyllc dianhydride (BPDA), 0.85 mol of 2,2'-bis(trifluoromethyl)benzidine (TFDB), and 0.15 mol of phenylenediamine are reacted in N-methyl-2-pyrrolidone (NMP) in a 500 mL round-bottomed flask at 20° C. for 48 hours, obtaining polyamic acid having a solid content of 18 wt %.

The polyamic acid has an intrinsic viscosity of 0.68 dL/g.

The polyamic acid is used as a polyimide precursor composition.

Synthesis Example 5

Preparation of Polyimide Precursor Composition 0.98 mol of 3,3',4,4'-biphenyltetracarboxyllc dianhydride (BPDA), 0.90 mol of 2,2'-bis(trifluoromethyl)benzidine (TFDB), and 0.10 mol of phenylenediamine are reacted in N-methyl-2-pyrrolidone (NMP) in a 500 mL round-bottomed flask at 20° C. for 48 hours, obtaining polyamic acid having a solid content of 18 wt %.

The obtained polyamic acid has an intrinsic viscosity of 0.59 dL/g.

Then, 0.02 mol of a compound represented by the following Chemical Formula 20 is added to the polyamic acid, preparing a polyimide precursor composition.

Chemical Formula 20

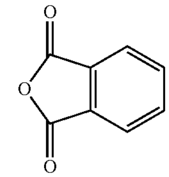

Example 1

Manufacture of Film

The polyimide precursor composition according to Synthesis Example 2 is coated on a glass substrate by a spin-coating method (1000 to 1500 rpm) and dried at 80° C. for 1 hour on a hot plate.

Next, the coated glass is heated up to 300° C. at a speed of 3° C./min and maintained at the same temperature for one hour, imidizing the polyamic acid included in the polyimide precursor composition and cross-linking the polyimide using a cross-linking agent, forming a cross-linked polyimide.

The cross-linked polyimide is used to form a film.

The film is 10 μm thick.

Example 2

Manufacture of Film

A film is formed according to the same method as Example 1 except for using the polyimide precursor composition according to Synthesis Example 3 instead of the polyimide precursor composition according to Synthesis Example 2.

The film is 10 μm thick.

Example 3

Manufacture of Film

A film is formed according to the same method as Example 2 except for using the polyimide precursor composition according to Synthesis Example 4 instead of the polyimide precursor composition according to Synthesis Example 2.

The film is 10 μm thick.

Comparative Example 1

Manufacture of Film

A film is formed according to the same method as Example 1 except for using the polyimide precursor composition according to Synthesis Example 5 instead of the polyimide precursor composition according to Synthesis Example 2.

The film is 10 μm thick.

Comparative Example 2

Manufacture of Film

A film is formed according to the same method as Example 1 except for using the polyimide precursor composition according to Synthesis Example 1 instead of the polyimide precursor composition according to Synthesis Example 2.

The film is 10 μm thick.

Experimental Example 1

Thermal Stability Evaluation

The films according to Examples 1 to 3 and Comparative Examples 1 and 2 are evaluated regarding thermal stability using a thermogravimetric analyzer (TGA Q5000, TA instruments Inc.) (a heating rate: 10° C./min). The thermal decomposition onset temperature (° C.) of the films and their weight loss ratio (%) at 400° C. are provided in the following Table 1.

Experimental Example 2

Measurement of Thermal Expansion Coefficient

The films according to Examples 1 to 3 and Comparative Examples 1 and 2 are measured regarding thermal expansion coefficient (CTE) using a thermo mechanical analyzer (5° C./min, pre-load: 10 mN, TMA 2940: TA Instrument Inc.).

In addition, the films are evaluated regarding glass transition temperature (Tg) by measuring on-set points in a thermal expansion curved line of TMA. The results are provided in the following Table 1.

Experimental Example 3

Optical Property Evaluation

The films according to Examples 1 to 3 and Comparative Examples 1 and 2 are measured regarding light transmittance, yellowness index (YI), and haze using a KONICA MINOLTA spectrophotometer to evaluate optical properties. The measurements are provided in the following Table 1.

TABLE 1

| | | Onset temperature (° C.) | Weight loss ratio (%, 400° C.) | Thermal expansion coefficient (ppm/° C. 50° C. to 150° C.) | Glass transition temperature (° C.) | Average light transmittance (%, 380 nm to 780 nm) | Light transmittance (%, 400 nm) | YI | Haze (%) |
|---|---|---|---|---|---|---|---|---|---|
| Ex. 1 | Synthesis Ex. 2 | 0.05 TA | 0.13 | 10.6 | 319.2 | 87.5 | 56.2 | 3.21 | 0.10 |
| Ex. 2 | Synthesis Ex. 3 | 0.10 TA | 0.08 | 10.6 | 321.1 | 87.2 | 50 | 3.75 | 0.17 |
| Ex. 3 | Synthesis Ex. 3 | 0.15 TA | 0.13 | 11.9 | 321 | 86.6 | 34 | 5.3 | 0.21 |
| Comp. Ex. 1 | Synthesis Ex. 1 | None End capping | 0.35 | 9 | 311.60 | 87.17 | 45.05 | 4.93 | 0.25 |
| Comp. Ex. 2 | Synthesis Ex. 5 | PA 0.10 | 0.18 | 3.6 | 310.3 | 88.1 | 55.1 | 3.52 | 0.14 |

Based on Table 1, the films according to Examples 1 to 3 have a higher glass transition temperature than the ones according to Comparative Examples 1 and 2, and have excellent light transmittance, yellowness index, and haze characteristics at a wavelength of 400 nm.

In addition, the films according to Examples 1 to 3 have an equivalent thermal expansion coefficient compared to the ones according to Comparative Examples 1 and 2 and an average transmittance at a wavelength ranging from 380 nm to 780 nm, and thus have excellent heat resistance and optical properties.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polyimide precursor composition, comprising:

a polyamic acid selected from compounds represented by Chemical Formulae 1 and 3, and a mixture thereof; and a cross-linking agent selected from a compound represented by Chemical Formula 4, and optionally, a solvent:

Chemical Formula 1

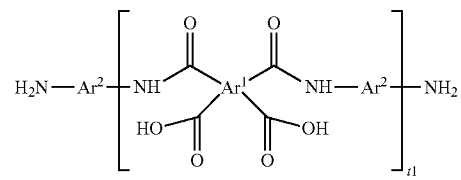

Chemical Formula 3

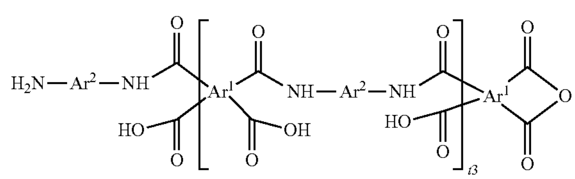

wherein, in Chemical Formulae 1 and 3, $Ar^1$ is the same or different in each repeating unit and is independently a tetravalent C3 to C30 alicyclic organic group, a tetravalent C6 to C30 aromatic organic group, a tetravalent C2 to C30 heterocyclic group, or a combination thereof such that the foregoing groups in the combination are fused or linked through a single bond, —O—, —S—, —C(=O)—, —CH(OH)—, $—S(=O)_2—$, $—Si(CH_3)_2—$, $—Si(CF_3)_2—$, $—(CH_2)_p—$ wherein $1 \leq p \leq 10$, $—(CF_2)_q—$ wherein $1 \leq q \leq 10$, $—C(CH_3)_2—$, $—C(CF_3)_2—$, or —C(=O)NH—, $Ar^2$ is the same or different in each repeating unit, and comprises a divalent C6 to C30 aromatic organic group, selected from the chemical formula:

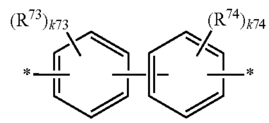

wherein,

—$R^{73}$ and —$R^{74}$ are the same or different and are independently a C1 to C10 aliphatic organic group substituted with a halogen, wherein —$R^{73}$ and —$R^{74}$ are selected such that the total number of carbon atoms in group $Ar^2$ does not exceed 30, k73 and k74 are independently integers ranging from 1 to 4, and t1, and t3 are independently integers of greater than or equal to 2, Chemical Formula 4

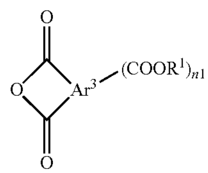

wherein, in Chemical Formula 4, $Ar^3$ is a trivalent C3 to C30 alicyclic organic group, a trivalent C6 to C30 aromatic organic group, a trivalent C2 to C30 heterocyclic group, or a combination thereof such that the foregoing groups in the combination are fused or linked through a single bond, —O—, —S—, —C(═O)—, —CH(OH)—, —S(═O)$_2$—, —Si(CH$_3$)$_2$—, —(CH$_2$)$_p$— wherein $1 \le p \le 10$, —(CF$_2$)$_q$— wherein $1 \le q \le 10$, —C(CH$_3$)$_2$—, —C(CF$_3$)$_2$—, or —C(═O)NH—, $R^1$ is the same or different, and is independently hydrogen, or a C1 to C30 alkyl group, n1 is an integer of $1 \le n1 \le$(valence number of $Ar^3$−2), and provided that the total number of carbon atoms in each of the groups $Ar^1$and $Ar^3$does not exceed 30, wherein the amount of the cross-linking agent is greater than 0 mol % and less than or equal to 5 mol % based on 100 mol % of the polyamic acid.

2. The polyimide precursor composition of claim 1, wherein $Ar^1$ is the same or different in each repeating unit and is independently selected from the chemical formulae:

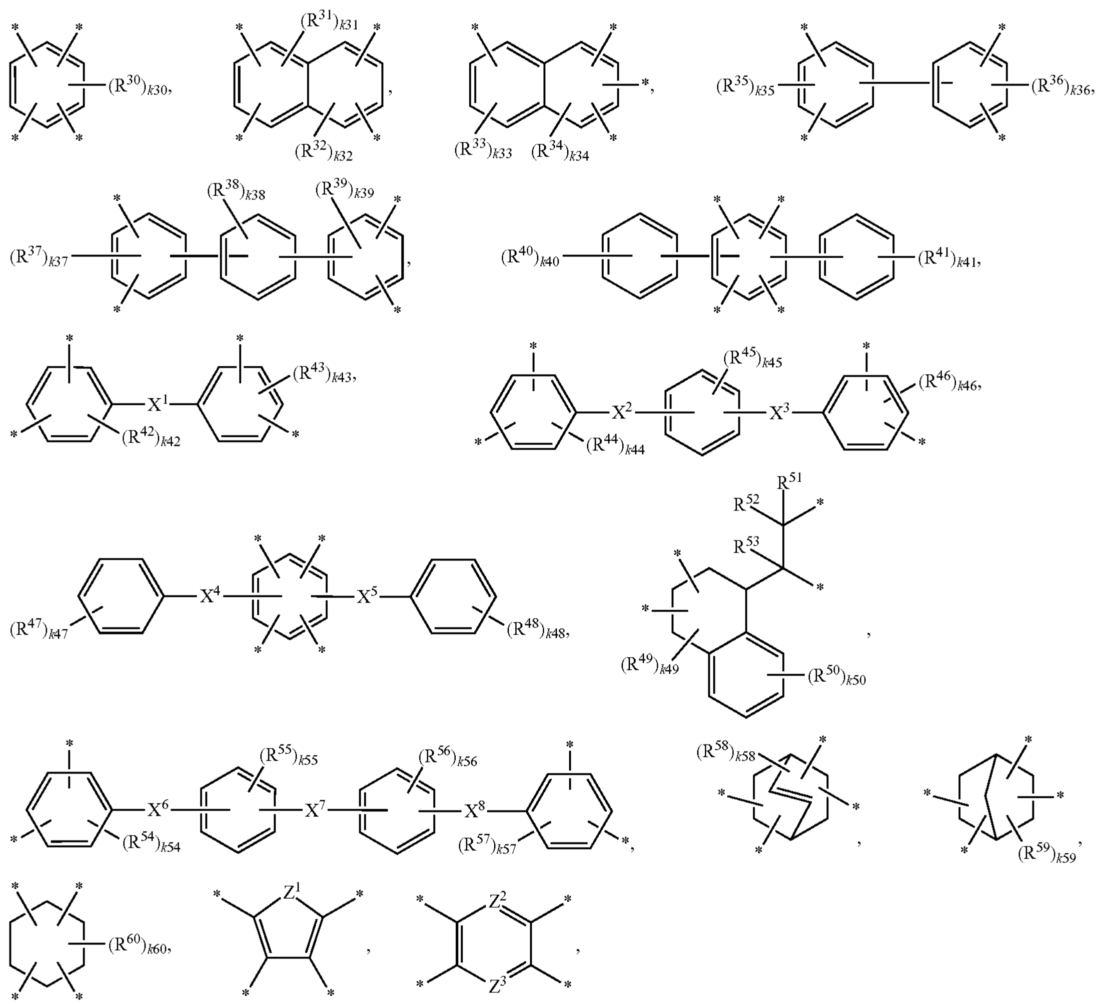

wherein, $X^1$ to $X^8$ are the same or different and are independently a single bond, —O—, —S—, —C(=O)—, —CH(OH)—, —S(=O)$_2$—, —Si(CH$_3$)$_2$—, —(CH$_2$)$_p$— wherein 123 p≤10, —(CF$_2$)$_q$—wherein 1≤q≤10, —C(CH$_3$)$_2$—, —C(CF$_3$)$_2$—, or —C(=O)NH—, $Z^1$ is —O—, —S—, or —NR$^{300}$—, wherein $R^{300}$ is hydrogen or a C1 to C5 alkyl group, $Z^2$ and $Z^3$ are the same or different and are independently —N=or —C(R$^{301}$)=wherein $R^{301}$ is hydrogen or a C1 to C5 alkyl group, provided that $Z^2$ and $Z^3$ are not simultaneously —C(R$^{301}$)=, $R^{30}$ to $R^{50}$and $R^{54}$ to $R^{60}$ are the same or different and are independently halogen, a C1 to C10 aliphatic organic group, or a C6C20 aromatic organic group, wherein $R^{30}$to $R^{50}R^{54}$ to $R^{60}$ are selected such that the total number of carbon atoms in group $Ar^1$ does not exceed 30, $R^{51}$ to $R^{53}$ are the same or different and are independently hydrogen, a halogen, a C1 to C10 aliphatic organic group, or a C6 to C20 aromatic organic group, k30, k31, and k32 are independently integers ranging from 0 to 2, k33, k35, k36, k37, k39, k42, k43, k44, k46, k54, and k57 are independently integers ranging from 0 to 3, k34 is an integer of 0 or 1, k38, k45, k50, k55, and k56 are independently integers ranging from 0 to 4, k40, k41, k47, k48, and k49 are independently integers ranging from 0 to 5, and k58, k59, and k60 are independently integers ranging from 0 to 8 , provided that the total number of carbon atoms in each of the chemical formulae representing $Ar^1$ does not exceed 30.

3. The polyimide precursor composition of claim 1, wherein $Ar^1$ is the same or different in each repeating unit and is independently selected from the chemical formulae:

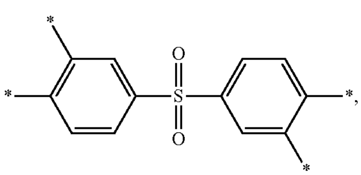

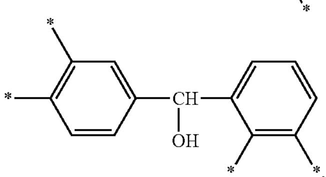

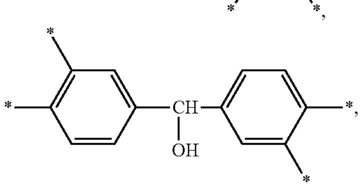

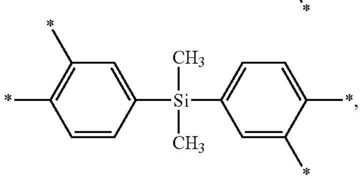

-continued

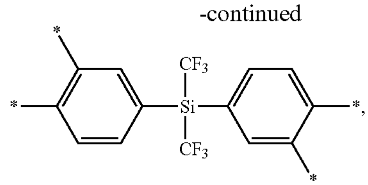

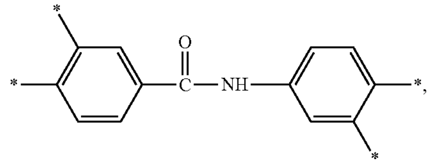

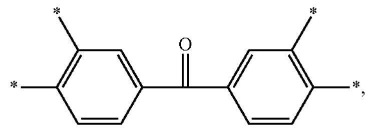

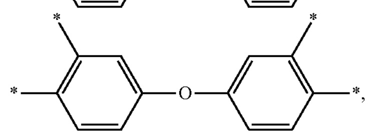

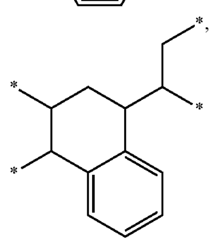

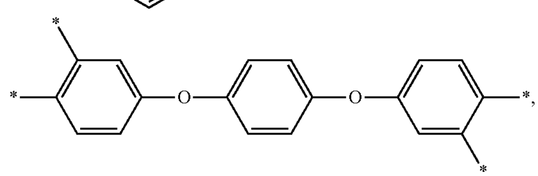

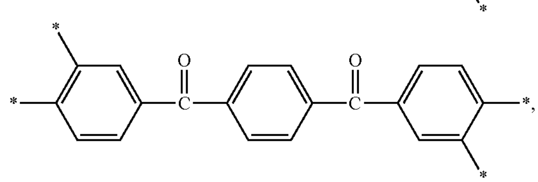

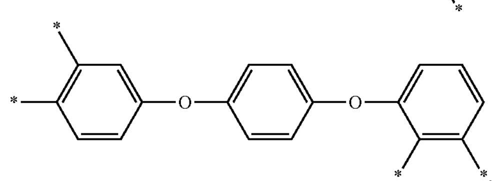

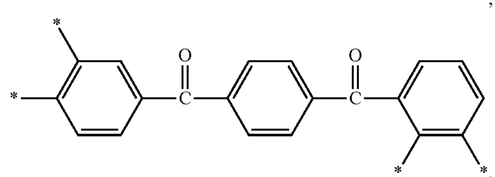

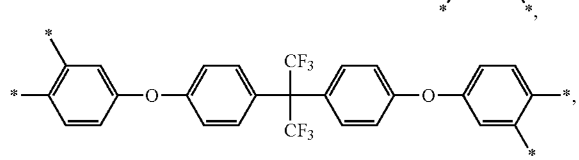

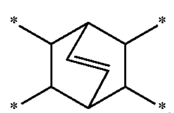

-continued

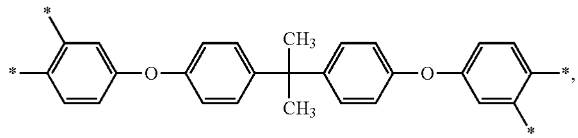

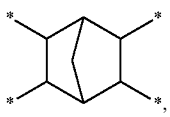

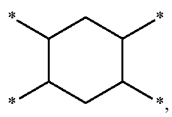

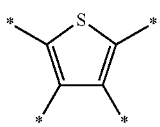

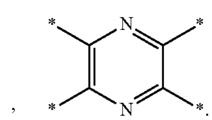

4. The polyimide precursor composition of claim 1, wherein $Ar^2$ comprises:

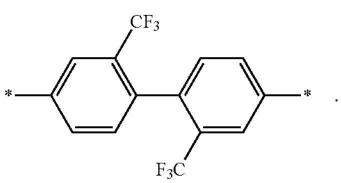 [SMILES: *c1ccc(-c2ccc(*)cc2C(F)(F)F)c(C(F)(F)F)c1]

5. The polyimide precursor composition of claim 1, wherein the cross-linking agent is selected from the chemical formulae:

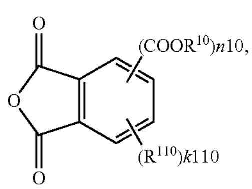

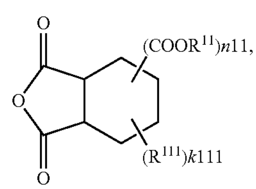

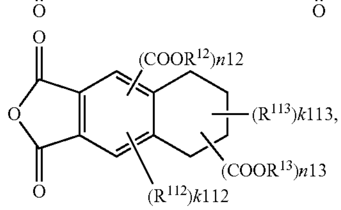

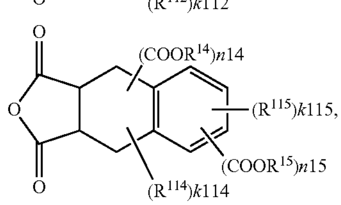

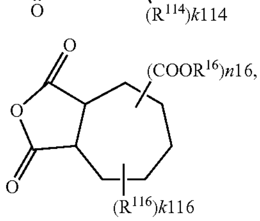

-continued

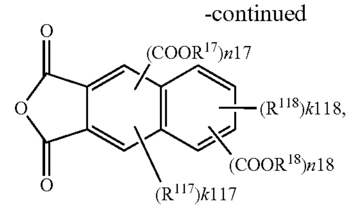

wherein, $R^{10}$ to $R^{18}$ are the same or different and are independently hydrogen, or a C1 to C30 alkyl group, n10 is an integer ranging from 1 to 4, n11 is an integer ranging from 1 to 10, n12 is an integer ranging from 0 to 2, n13 is an integer ranging from 0 to 8, provided that n12+n13 is an integer of greater than or equal to 1, n14 is an integer ranging from 0 to 6, n15 is an integer ranging from 0 to 4, provided that n14+n15 is an integer of greater than or equal to 1, n16 is an integer ranging from 1 to 12, n17 is an integer ranging from 0 to 2, n18 is an integer ranging from 0 to 4, provided that n17+n18 is an integer of greater than or equal to 1, $R^{110}$ to $R^{118}$ are the same or different and are independently a halogen, a substituted or unsubstituted C1 to C10 aliphatic organic group, or a substituted or unsubstituted C6 to C20 aromatic organic group, k110 is an integer ranging from 0 to 3, k111 is an integer ranging from 0 to 9, k112 is an integer ranging from 0 to 2, k113 is an integer ranging from 0 to 8, k112+k113 is an integer ranging from 0 to 9, k114 is an integer ranging from 0 to 6, k115 is an integer ranging from 0 to 4, k114+k115 is an integer ranging from 0 to 9, k116 is an integer ranging from 0 to 11, k117 is an integer ranging from 0 to 2, k118 is an integer ranging from 0 to 4, k117+k118 is an integer ranging from 0 to 5, provided that the total number of carbon atoms in a moiety corresponding to $Ar^3$ of Chemical Formula 4 in each of the chemical formulae representing the cross-linking agent does not exceed 30.

6. The polyimide precursor composition of claim 1, wherein the cross-linking agent is selected from the chemical formulae:

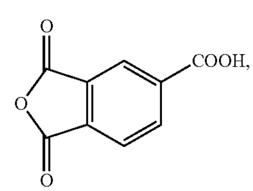

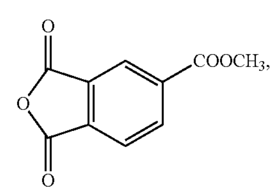

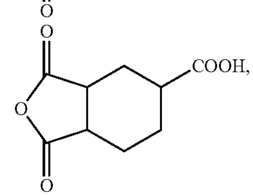

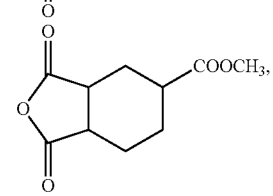

-continued

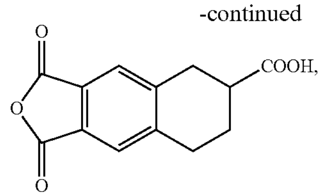

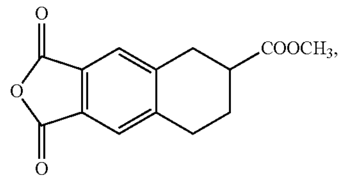

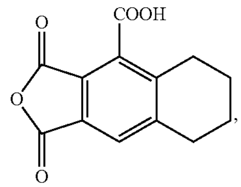

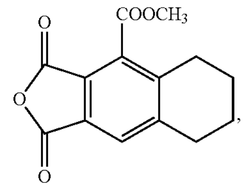

-continued

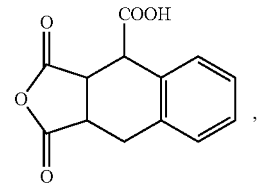

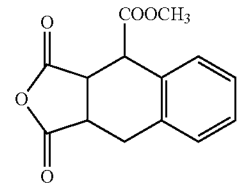

7. The polyimide precursor composition of claim 1, wherein the polyamic acid is selected from a compound represented by Chemical Formula 1-1, a compound represented by Chemical Formula 3-1, and a mixture thereof, and the cross-linking agent is selected from compounds represented by Chemical Formulae 4-1 to 4-6 and a mixture thereof:

Chemical Formula 1-1

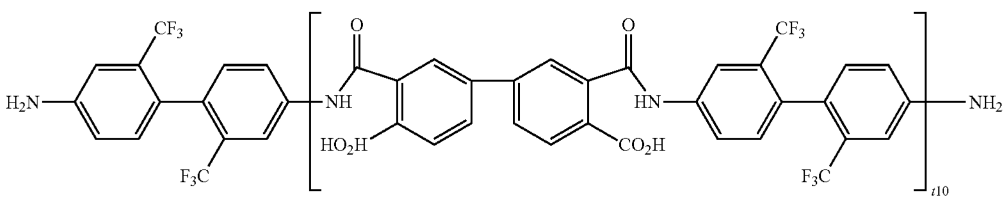

Chemical Formula 3-1

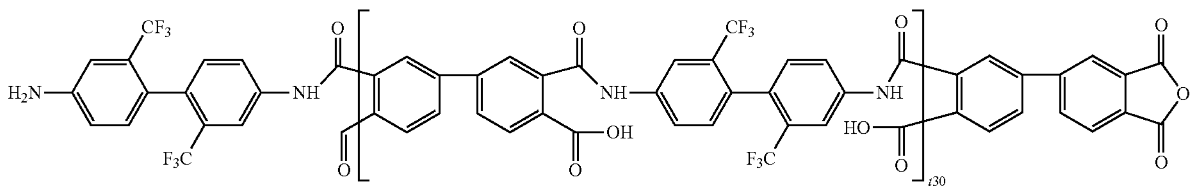

-continued

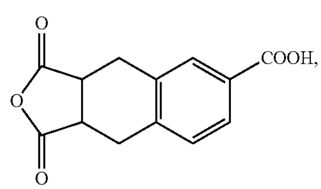

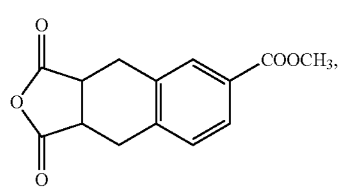

wherein, in Chemical Formulae 1-1, and 3-1, t10 and t30 are independently integers of greater than or equal to 2, Chemical Formula 4-1 and Chemical Formula 4-2

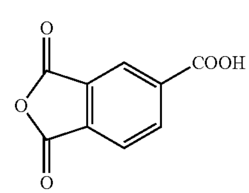

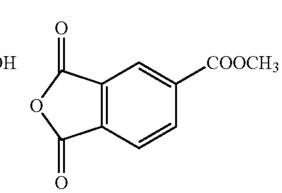

-continued

Chemical Formula 4-3 and Chemical Formula 4-4

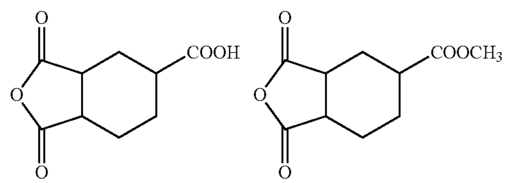

Chemical Formula 4-5 and Chemical Formula 4-6

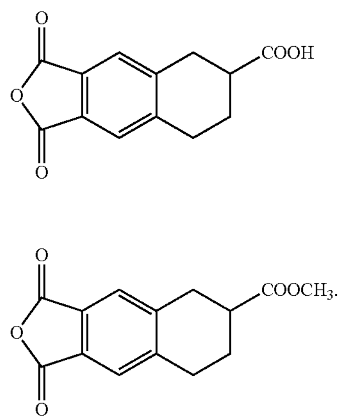

8. The polyimide precursor composition of claim 7, wherein the composition further comprises a polyamic acid selected from a compound represented by the Chemical Formula 1-2, a compound represented by Chemical Formula 2-2, a compound represented by Chemical Formula 3-2, and a mixture thereof wherein, in Chemical Formulae 1-2, 2-2, and 3-2, t11, t21, and t31 are independently integers of greater than or equal to 2.

9. The polyimide precursor composition of claim 1, which comprises a polyamic acid comprising a unit represented by the Chemical Formula 1, and a cross-linking agent represented by the Chemical Formula 4.

10. The polyimide precursor composition of claim 9, wherein the polyimide precursor composition satisfies Equation 1:

$$A_1+C_1=B_1 \qquad \text{Equation 1}$$

wherein, in Equation 1, $A_1$ is a mole number of a dianhydride used for preparing the compound represented by the Chemical Formula 1, $B_1$ is a mole number of a diamine used for preparing the compound represented by the Chemical Formula 1, $C_1$ is a mole number of the cross-linking agent, and $C_1$ is greater than 0 mol % and less than or equal to about 5 mol % based on the total amount of 100 mol % of $A_1+B_1+C_1$.

11. The polyimide precursor composition of claim 1, wherein the polyamic acid has an intrinsic viscosity of about 0.1 dL/g to about 2.0 dL/g.

12. The polyimide precursor composition of claim 1, wherein the polyimide precursor composition has a viscosity of about 10 cps to about 30,000 cps.

13. A polyimide precursor composition comprising the composition of claim 1 and an additional polyamic acid, which is a reaction product of the polyamic acid represented by Chemical Formula 1 and the crosslinking agent represented by Chemical Formula 4, and wherein the additional polyamic acid comprises a compound selected from a compound represented by Chemical Formula 6, a compound represented by Chemical Formula 7, and a mixture thereof:

Chemical Formula 1-2

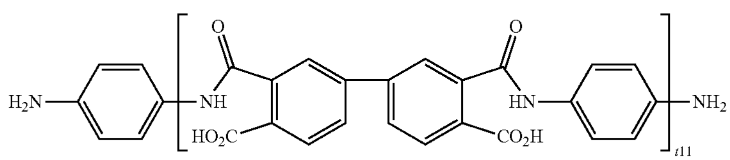

Chemical Formula 2-2

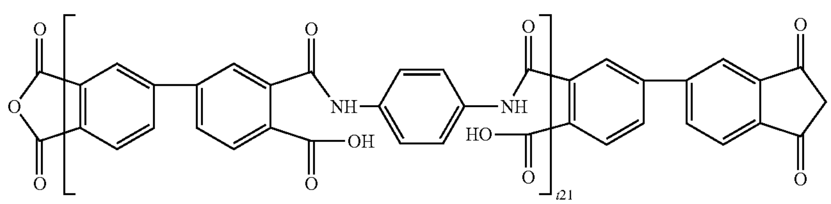

Chemical Formula 3-2

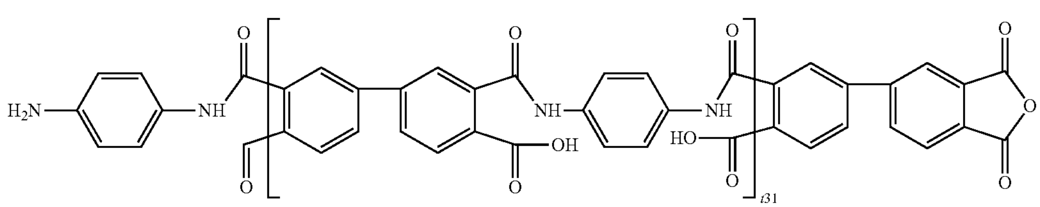

Chemical Formula 6

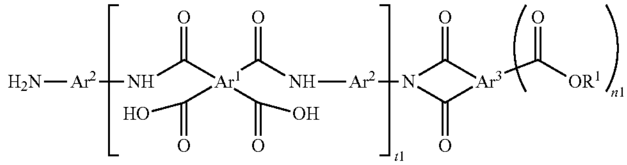

Chemical Formula 7

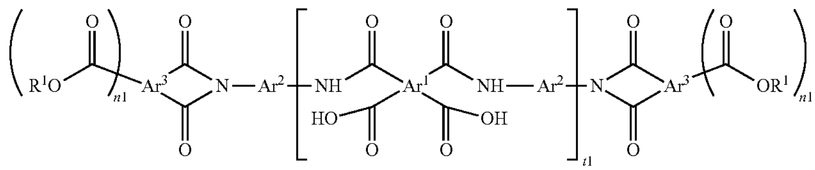

wherein, in Chemical Formulae, 6, and 7, $Ar^1$ is the same or different in each repeating unit and is independently a tetravalent C3 to C30 alicyclic organic group, a tetravalent C6 to C30 aromatic organic group, a tetravalent C2 to C30 heterocyclic group, or a combination thereof such that the foregoing groups in the combination are fused or linked through a single bond —O—, —S—, —C(═O)—, —CH(OH)—, —S(═O)$_2$—, —Si(CH$_3$)$_2$—, —Si(CF$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, or —C(═O)NH—, $Ar^2$ is the same or different for each occurrence, and comprises a divalent C6 to C30 aromatic organic group selected from the chemical formula:

$R^1$ is the same or different for each occurrence and is independently hydrogen, or a C1 to C30 alkyl group, and n1 is an integer of 1≤n1≤(valence number of $Ar^3$−2), provided that the total number of carbon atoms in each of the groups $Ar^1$, $Ar^2$, and $Ar^3$, does not exceed 30.

14. The polyimide precursor composition comprising the composition of claim 1, and a cross-linked polyamic acid, which is an additional reaction product of the polyamic acid represented by Chemical Formula 1 and the crosslinking agent represented by Chemical Formula 4, and the cross-linked polyamic acid comprises a represented by Chemical Formula 8:

Chemical Formula 8

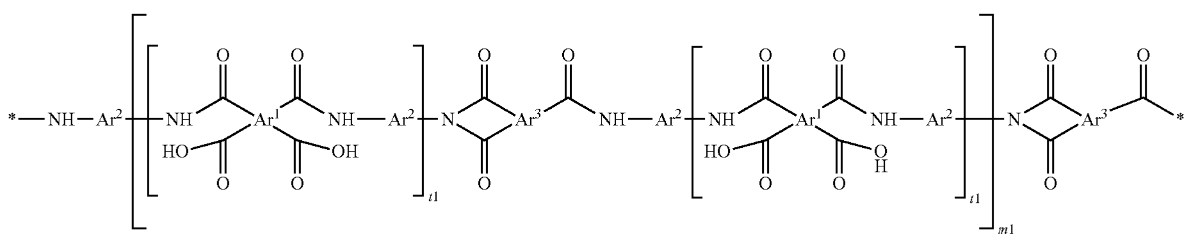

wherein

—$R^{73}$ and $R^{74}$ are the same or different and are independently a C1 to C10 aliphatic organic group substituted with a halogen, wherein $R^{73}$ and $R^{74}$ are selected such that the total number of carbon atoms in group $Ar^2$ does not exceed 30, k73 and k74 are independently integers ranging from 1 to 4;

t1 is an integer of greater than or equal to 2, $Ar^3$ is the same or different for each occurrence and is independently a trivalent C3 to C30 alicyclic organic group, a trivalent C6 to C30 aromatic organic group, a trivalent C2 to C30 heterocyclic group, or a combination thereof such that the foregoing groups in the combination are fused or linked to each other to provide a condensed ring: or two or more thereof are linked through a single bond —O—, —S—, —C(═O)—, —CH(OH)—, —S(═O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, or —C(═O)NH—, wherein, in Chemical Formula 8, $Ar^1$is the same or different in each repeating unit and is independently a tetravalent C3 to C30 alicyclic organic group, a tetravalent C6 to C30 aromactic organic group, or a tetravalent C2 to C30 heterocylic group,or a combination thereof such that the foregoing groups in the combination are fused or linked to each other to provide a condensed ring; or more thereof are linked through a single bond —O—, —S—, —C(═O)—, —CH(OH)—, —S(═O)$_2$—, —Si(CH$_3$)$_2$—, —Si(CF$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, or —C(═O)NH—, $Ar^2$ is the same or different in each repeating unit, and comprises a divalent C6 to C30 aromatic organic group, selected from the chemical formula:

wherein

—$R^{73}$ and $R^{74}$ are the same or different and are independently a C1 to C10 aliphatic organic group substituted with a halogen, wherein $R^{73}$ and $R^{74}$ are selected such that the total number of carbon atoms in group $Ar^2$ does not exceed 30, k73 and k74 are independently integers ranging from 1 to 4;

t1 is an integer of greater than or equal to 2, $Ar^3$ is the same or different for each occurrence and is independently a trivalent C3 to C30 alicyclic organic group, a trivalent C6 to C30 aromatic organic group, a trivalent C2 to C30 heterocyclic group, or a combination thereof such that the foregoing groups in the combination are fused or linked through a single bond, —O—, —S—, —C(=O)—, —CH(OH)—, $—S(=O)_2—$, $—Si(CH_3)_2—$, $—(CH_2)_p—$ wherein $1 \le p \le 10$, $—(CF_2)_q—$ wherein $1 \le q \le 10$, $—C(CH_3)_2—$, $—C(CF_3)_2—$, or —C(=O)NH—, and m1 is an integer of greater than or equal to 1, provided that the total number of carbon atoms in each of the group $Ar^1$, $Ar^2$, and $Ar^3$, does not exceed 30.

15. An article comprising a cross-linked polyimide prepared from the polyimide precursor composition of claim 1.

16. The article of claim 15, Wherein the cross-linked polyimide is obtained from a polyimide selected from compounds represented by Chemical Formulae 9 and 11, and a mixture thereof that is cross-linked by using a cross-linking agent selected from the compound represented by Chemical Formula 4,the compound represented by Chemical Formula 5, and a mixture thereof:

Chemical Formula 9

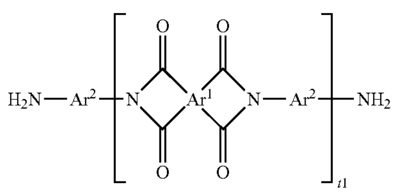

Chemical Formula 11

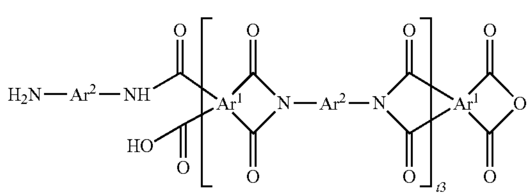

wherein, in Chemical Formulae 9 to 11, $Ar^1$ is the same or different in each repeating unit and is independently a tetravalent C3 to C30 alicyclic organic group, a tetravalent C6 to C30 aromatic organic group, a tetravalent C2 to C30 heterocyclic group, or a combination thereof such that the foregoing groups in the combination are fused or linked through a single bond, —O—, —S—, —C(=O)—, —CH(OH)—, $—S(=O)_2—$, $—Si(CH_3)_2—$, $—Si(CF_3)_2—$, $—(CH_2)_p—$ wherein $1 \le p \le 10$, $—(CF_2)_q—$ wherein $1 \le q \le 10$, $—C(CH_3)_2—$, $—C(CF_3)_2—$, or —C(=O)NH—, $Ar^2$ is the same or different in each repeating unit, and comprises a divalent C6 to C30 aromatic organic group, selected from the chemical formula:

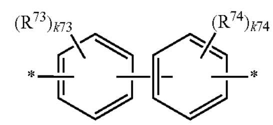

wherein, $—R^{73}$ and $—R^{74}$ are the same or different and are independently a C1 to C10 aliphatic organic group substituted with a halogen, wherein $—R^{73}$ and $—R^{74}$ are selected such that the total number of carbon atoms in group $Ar^2$ does not exceed 30, k73 and k74 are independently integers ranging from 1 to 4, and t1, t2, and t3 are independently integers of greater than or equal to 2, Chemical Formula 4

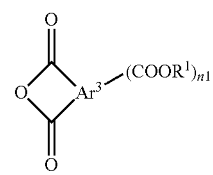

wherein, in Chemical Formula 4, $Ar^3$ is a trivalent C3 to C30 alicyclic organic group, a trivalent C6 to C30 aromatic organic group, a trivalent C2 to C30 heterocyclic group, or a combination thereof such that the foregoing groups in the combination are fused or linked through a single bond, , —O—, —S—, —C(=O)—, —CH(OH)—, $—S(=O)_2—$, $—Si(CH_3)_2—$, $—(CH_2)_p—$ wherein $1 \le p \le 10$, $—(CF_2)_q—$ wherein $1 \le q \le 10$, $—C(CH_3)_2—$, $—C(CF_3)_2—$, or —C(=O)NH—, $R^1$ is the same or different, and is independently hydrogen, or a C1 to C30 alkyl group, n1 is an integer of $1 \le n1 \le$(valence number of $Ar^3-2$), and provided that the total number of carbon atoms in each of the groups $Ar^1$; and $Ar^3$does not exceed 30.

17. The article of claim 15, wherein the cross-linked polyimide comprises a repeating unit represented by Chemical Formula 12:

Chemical Formula 12

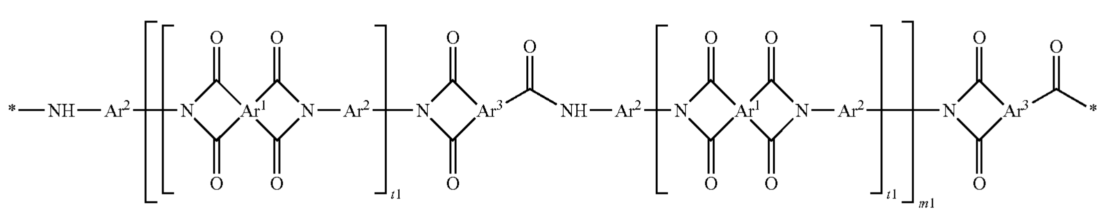

wherein, in Chemical Formula 12, $Ar^1$ is the same or different in each repeating unit and is independently a tetravalent C3 to C30 alicyclic organic group, a tetravalent C6 to C30 aromatic organic group, a tetravalent C2 to C30 heterocyclic group, or a combination thereof such that the foregoing groups in the combination are fused or linked through a single bond, —O—, —S—, —C(═O)—, —CH(OH)—, —S(═O)$_2$—, —Si(CH$_3$)$_2$—, —Si(CF$_3$)$_2$—, —(CH$_2$)$_p$— wherein $1 \leq p \leq 10$, —(CF$_2$)$_q$— wherein $1 \leq q \leq 10$, —C(CH$_3$)$_2$—, —C(CF$_3$)$_2$—, or —C(═O)NH—, $Ar^2$ is the same or different in each repeating unit, and comprises a divalent C6 to C30 aromatic organic group, selected from the chemical formula:

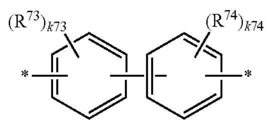

wherein,

—$R^{73}$ and —$R^{74}$ are the same or different and are independently a C1 to C10 aliphatic organic group substituted with a halogen, wherein —$R^{73}$ and —$R^{74}$ are selected such that the total number of carbon atoms in group $Ar^2$ does not exceed 30, k73 and k74 are independently integers ranging from 1 to 4, and t1, t2, and t3 are independently integers of greater than or equal to 2, $Ar^3$ is the same or different for each occurrence and is independently a trivalent C3 to C30 alicyclic organic group, a trivalent C6 to C30 aromatic organic group, a trivalent C2 to C30 heterocyclic group, or a combination thereof such that the foregoing groups in the combination are fused or linked through a single bond, —O—, —S—, —C(═O)—, —CH(OH)—, —S(═O)$_2$—, —Si(CH$_3$)$_2$—, —(CH$_2$)$_p$— wherein $1 \leq p \leq 10$, —(CF$_2$)$_q$— wherein $1 \leq q \leq 10$, —C(CH$_3$)$_2$—, —C(CF$_3$)$_2$—, or —C(═O)NH—, and m1 is an integer of greater than or equal to 1, provided that the total number of carbon atoms in each of the group $Ar^1$, $Ar^2$, and $Ar^3$, does not exceed 30.

18. The article of claim 15, wherein the cross-linked polyimide has a weight average molecular weight of about 1000 g/mol to about 100,000 g/mol.

19. The article of claim 15, wherein the article has a light transmittance of greater than or equal to about 45% at a wavelength of about 400 nm.

* * * * *